(12) United States Patent
Hayakawa

(10) Patent No.: US 8,757,719 B2
(45) Date of Patent: Jun. 24, 2014

(54) VEHICLE SEAT

(75) Inventor: Yoshikuni Hayakawa, Tokai (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 147 days.

(21) Appl. No.: 13/566,073

(22) Filed: Aug. 3, 2012

(65) Prior Publication Data

US 2013/0038108 A1 Feb. 14, 2013

(30) Foreign Application Priority Data

Aug. 11, 2011 (JP) ................................. 2011-176091

(51) Int. Cl.
B60N 2/02 (2006.01)

(52) U.S. Cl.
USPC ......... 297/333; 297/331; 297/332; 297/378.1

(58) Field of Classification Search
USPC .................. 297/331, 332, 333, 378.1, 378.12, 297/378.13; 296/65.05, 65.11, 65.13
See application file for complete search history.

(56) References Cited

U.S. PATENT DOCUMENTS

| | | | | |
|---|---|---|---|---|
| 5,707,103 A | * | 1/1998 | Balk | 297/13 |
| 6,106,066 A | * | 8/2000 | Moffa et al. | 297/332 |
| 6,460,922 B1 | * | 10/2002 | Demick | 297/14 |
| 6,460,929 B2 | * | 10/2002 | Kamida | 297/344.1 |
| 6,669,261 B2 | * | 12/2003 | Roberts et al. | 296/65.09 |
| 6,962,384 B2 | * | 11/2005 | Rhodes et al. | 296/66 |
| 7,753,428 B2 | * | 7/2010 | Kato et al. | 296/65.09 |
| 7,802,850 B2 | | 9/2010 | Deissmann et al. | |
| 2003/0080577 A1 | | 5/2003 | Roberts et al. | |
| 2007/0236068 A1 | | 10/2007 | Deissmann et al. | |
| 2010/0109411 A1 | * | 5/2010 | Shinohara | 297/378.13 |
| 2011/0241401 A1 | | 10/2011 | Otsuka | |

FOREIGN PATENT DOCUMENTS

| | | |
|---|---|---|
| DE | 10341375 | 4/2005 |
| DE | 102004044363 | 3/2006 |
| EP | 1623869 | 10/2008 |
| JP | 5-85243 | 4/1993 |
| JP | 2003-320876 | 11/2003 |

OTHER PUBLICATIONS

Germany Office action, dated Mar. 1, 2013 along with an english translation thereof.

* cited by examiner

*Primary Examiner* — Philip Gabler
(74) *Attorney, Agent, or Firm* — Greenblum & Bernstein, P.L.C.

(57) ABSTRACT

In a vehicle seat, a first slide mechanism disposed on a side wall side of the vehicle compartment is provided with a hinge mechanism having a biasing member that flips up a seat body toward the side wall, and a second slide mechanism disposed on the inner side of the vehicle compartment is provided with a coupling/decoupling switching mechanism for locking or unlocking the mutually coupled second slide mechanism and seat body. The seat body is flipped up by the biasing member when the coupling/decoupling switching mechanism is in the unlocking position. A flip-up position detecting unit is provided for detecting a predetermined flip-up position of the seat body within a slidable range of the seat body, and the coupling/decoupling switching mechanism is switched to the unlocking position when the flip-up position detecting unit detects the flip-up position.

4 Claims, 20 Drawing Sheets

F I G . 2
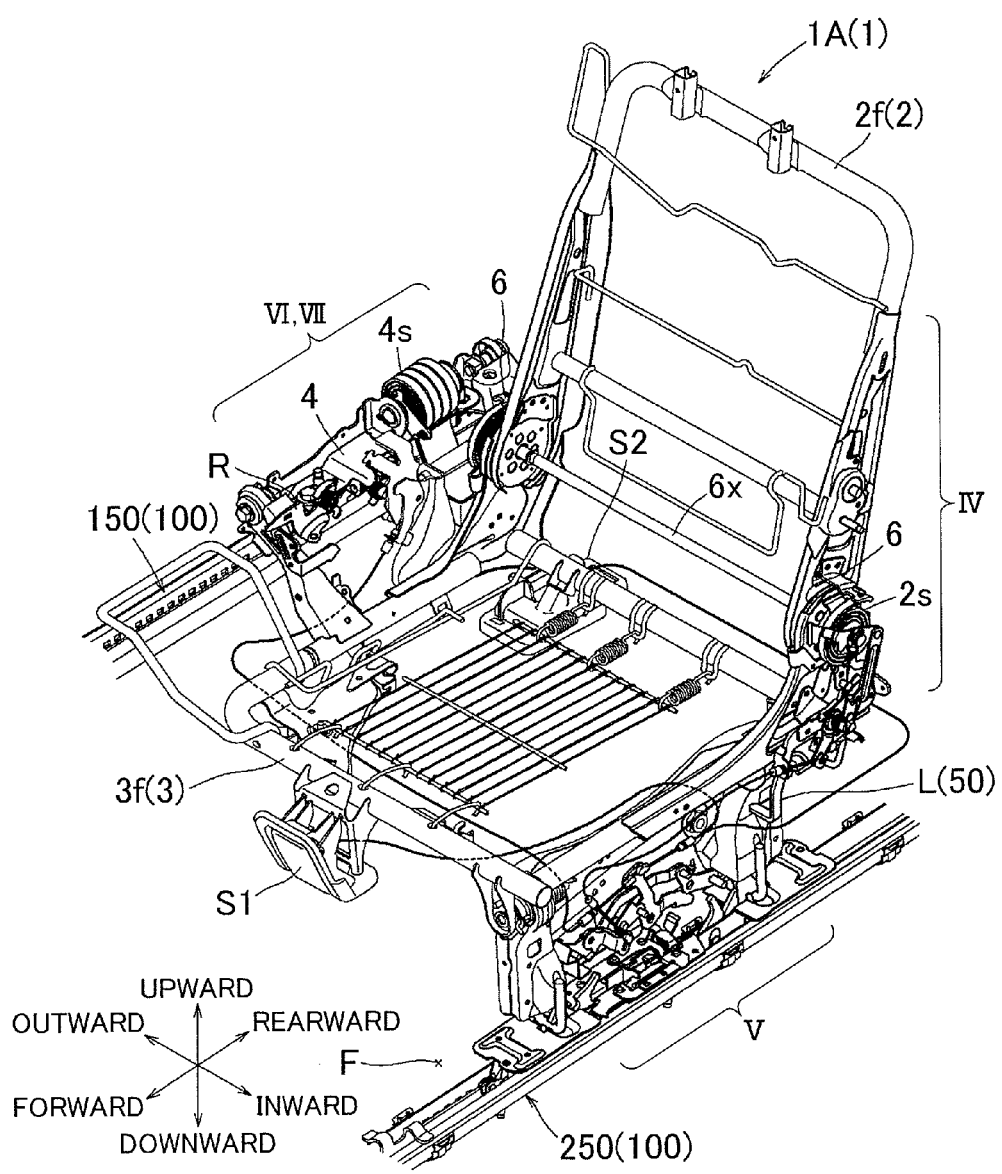

FIG. 9
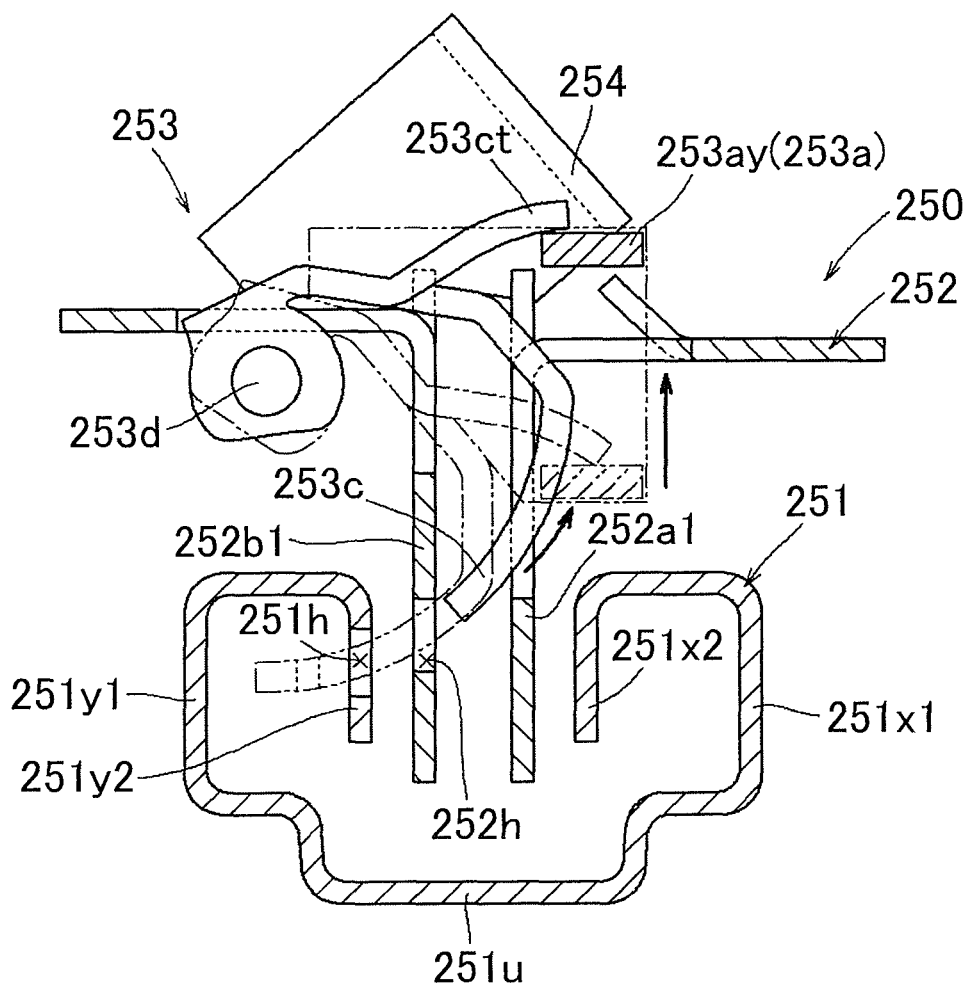
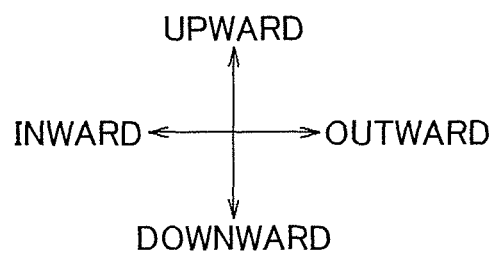

VEHICLE SEAT

INCORPORATION BY REFERENCE

The disclosure of Japanese Patent Application No. 2011-176091 filed on Aug. 11, 2011 including the specification, drawings and abstract is incorporated herein by reference in its entirety.

BACKGROUND OF THE INVENTION

1. Field of the Invention

The invention relates to a vehicle seat.

2. Description of Related Art

A flip-up storage type vehicle seat called "space up seat" as disclosed in, for example, Japanese Patent Application Publication No. 2004-8334 (JP 2004-8334 A) is known. The vehicle seat as disclosed in JP 2004-8334 A is stored by flipping up a seat body of a rear seat toward a side wall of the vehicle compartment, so that the cargo area within the vehicle can be expanded, and effective use can be made of space within the vehicle. The vehicle seat is comprised of a seat body having a seat cushion and a seat back. The vehicle seat is slidably installed on a vehicle-body constituent member (such as a floor of the vehicle) via a slide mechanism placed between the vehicle-body constituent member and the seat body. The seat body can be placed in two positions, i.e., a standing position in which the seat back stands up relative to the seat cushion, and a flat position in which the seat back is tilted forward or rearward, and can be flipped up toward the side wall of the vehicle department and stored when it is in the flat position. Generally, the position (flip-up position) at which the seat body of the vehicle seat is flipped up and stored is limited to a predetermined position within a range of sliding movement of the seat body. This arrangement is intended to avoid a situation where the seat body cannot be stored in place due to its interference with a structural member or other equipment of the vehicle, for example, even if the seat body is operated to be flipped up and stored at a desired position. Thus, in order to move the seat body to the flip-up position, a slide mechanism is operated to slide the seat body until it is confirmed by visual checking that a mark provided on a shield of the seat body is aligned with a mark provided on a trim of the vehicle body.

However, if the marks indicating the flip-up position in the vehicle seat vary from vehicle to vehicle in the manufacturing process, the seat body may not be moved to the nominal flip-up position. If the seat body is located at a position different from the nominal flip-up position, it cannot be smoothly flipped up even if a rotation hinge mechanism for flipping up the seat is operated. If the alignment for positioning the vehicle seat at the flip-up position is checked in high ambient light levels, it may be easily deteimined whether the seat is located at the nominal flip-up position. However, in low ambient light levels, it may be difficult to visually check the marks on the seat body and the vehicle trim, and position the vehicle seat at the nominal flip-up position, thus leaving room for improvement in terms of operating ease and efficiency. The vehicle seat as described above includes a mechanism for flipping up and storing the seat body, in addition to the above-mentioned slide mechanism. The flip-up mechanism includes a biasing member for flipping up the seat body that is in the flat position, toward the side wall of the vehicle compartment. In the vehicle seat as described above, these two mechanisms, i.e., the slide mechanism and the flip-up mechanism, need to be operated so as to store the seat body in place, which requires the operator to perform a plurality of operations or manipulations, or a cumbersome procedure.

SUMMARY OF THE INVENTION

The invention provides a vehicle seat in which a flip-up position at which a seat body can be flipped up and stored can be easily determined.

A vehicle seat according to one aspect of the invention includes a seat body having a seat cushion and a seat back, and a slide mechanism provided on a vehicle body constituent member, and mounting the seat body thereon such that the seat body is slidable relative to the vehicle body constituent member. The seat body is selectively placed in two positions, i.e., a standing position in which the seat back stands up relative to the seat cushion, and a forward-tilted position in which the seat back is tilted forward, and the seat body is adapted to be flipped up toward a side wall of a vehicle compartment and stored when the seat body is in the forward-tilted position. The slide mechanism includes a first slide mechanism and a second slide mechanism that are located on opposite sides of the seat body and installed in parallel with each other to extend in a longitudinal direction of the vehicle. The second slide mechanism is disposed inwardly of the first slide mechanism in the vehicle compartment, as viewed in a width direction of the vehicle. The first slide mechanism is provided with a rotation hinge mechanism including a biasing member that causes the seat body to flip up toward the side wall of the vehicle compartment. The second slide mechanism is provided with a coupling/decoupling switching mechanism that is selectively placed in a locking position in which the second slide mechanism and the seat body are coupled with each other, and an unlocking position in which the second slide mechanism and the seat body are allowed to be decoupled from each other. The seat body is adapted to be flipped up by the biasing member when the coupling/decoupling switching mechanism is in the unlocking position. The slide mechanism includes a flip-up position detecting unit that detects a predeteimined flip-up position of the seat body within a slidable range over which the seat body is slidable on the slide mechanism. The coupling/decoupling switching mechanism is switched to the unlocking position when the flip-up position detecting unit detects the predetermined flip-up position.

According to the above aspect of the invention, the vehicle seat constructed as described above includes the flip-up position detecting unit. Therefore, the seat body is positioned to be aligned with the flip-up position without requiring visual checking, and it can be easily determined by the flip-up position detecting unit that the seat body is placed in the flip-up position. When the flip-up position detecting unit detects the flip-up position, the coupling/decoupling switching mechanism is switched to the unlocking position so as to release the lock on the seat body and the second slide mechanism, thus assuring improved operating ease and efficiency.

In the above aspect of the invention, each of the first slide mechanism and the second slide mechanism may include a lower rail disposed on the vehicle body constituent member, and an upper rail on which the seat body is mounted, and the lower rail and the upper rail are slidably engaged with each other. Each of the first slide mechanism and the second slide mechanism may also include a slide locking mechanism placed between the lower rail and the upper rail and operable to lock the lower rail and the upper rail at a desired position in a sliding direction thereof for positioning of the upper and lower rails relative to each other. The slide mechanism may include an operating mechanism that operates the coupling/ decoupling switching mechanism and the slide locking mechanism in conjunction with each other. The coupling/decoupling switching mechanism may include a hook and a striker placed between the upper rail of the second slide mechanism and a lower portion of the seat body, and the hook and the striker may be adapted to be engaged with each other so as to couple the second slide mechanism with the seat body, and disengaged from each other so as to decouple the second slide mechanism from the seat body. When the flip-up position detecting unit detects the flip-up position of the seat body, the operating mechanism may operate to place the slide locking mechanism in a slide locking position for locking the slide mechanism, in conjunction with an operation thereof to place the coupling/decoupling switching mechanism in the unlocking position, so that the seat body located at the flip-up position is automatically flipped up.

With the above arrangement, the operating mechanism operates the coupling/decoupling switching mechanism and the slide locking mechanism in conjunction with each other. When the flip-up position detecting unit detects the flip-up position of the seat body, the coupling/decoupling switching mechanism is placed in the unlocking position, and the slide locking mechanism are placed in the slide locking position. As a result, the seat body is automatically flipped up when it reaches the flip-up position. With the operating mechanism operating the coupling/decoupling switching mechanism and the slide locking mechanism in conjunction with each other, the seat body located at the flip-up position can be automatically flipped up. Thus, the operator is not required to perform two or more operations or manipulations on the two mechanisms, i.e., the slide mechanism and the mechanism for flipping up and storing the seat body, thus assuring further improved operating ease and efficiency.

The vehicle seat as described above may further include a forward-tilted position detecting unit that detects that the seat body is in the forward-tilted position. The operating mechanism may start operating the coupling/decoupling switching mechanism and the slide locking mechanism when the forward-tilted position detecting unit detects that the seat body is in the forward-tilted position.

With the above arrangement, a single operation to tilt the seat back forward leads to a series of actions automatically taken by the seat body, so that the seat body is flipped up toward the side wall of the vehicle compartment and stored in place, thus assuring further improved operating ease and efficiency.

In the vehicle seat as described above, the slide mechanism may include a restricting mechanism that inhibits the coupling/decoupling switching mechanism from being placed in the unlocking position until the slide locking mechanism is completely placed in the slide locking position, when the operating mechanism operates the slide locking mechanism and the coupling/decoupling switching mechanism in conjunction with each other.

With the above arrangement, the coupling/decoupling switching mechanism is not placed in the unlocking position until the slide locking mechanism is completely placed in the slide locking position. If the coupling/decoupling switching mechanism is placed in the unlocking position and the seat body is flipped up while the seat body located at the flip-up position is not in the slide locked state, it may become difficult to couple the seat body with the second slide mechanism again at the flip-up position. To prevent this situation, the restricting mechanism restricts the operations of the coupling/decoupling switching mechanism and the slide mechanism, so as to improve the reliability with which the seat body is stored.

The present invention constructed as described above provides the vehicle seat in which the flip-up position at which the seat body can be flipped up and stored can be easily determined.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is an overall perspective view mainly showing the framework structure of the vehicle seat according to the embodiment of FIG. 1;

FIG. 9 is a cross-sectional view taken along line IX-IX in FIG. 8;

DETAILED DESCRIPTION OF EMBODIMENTS

Figure 1:
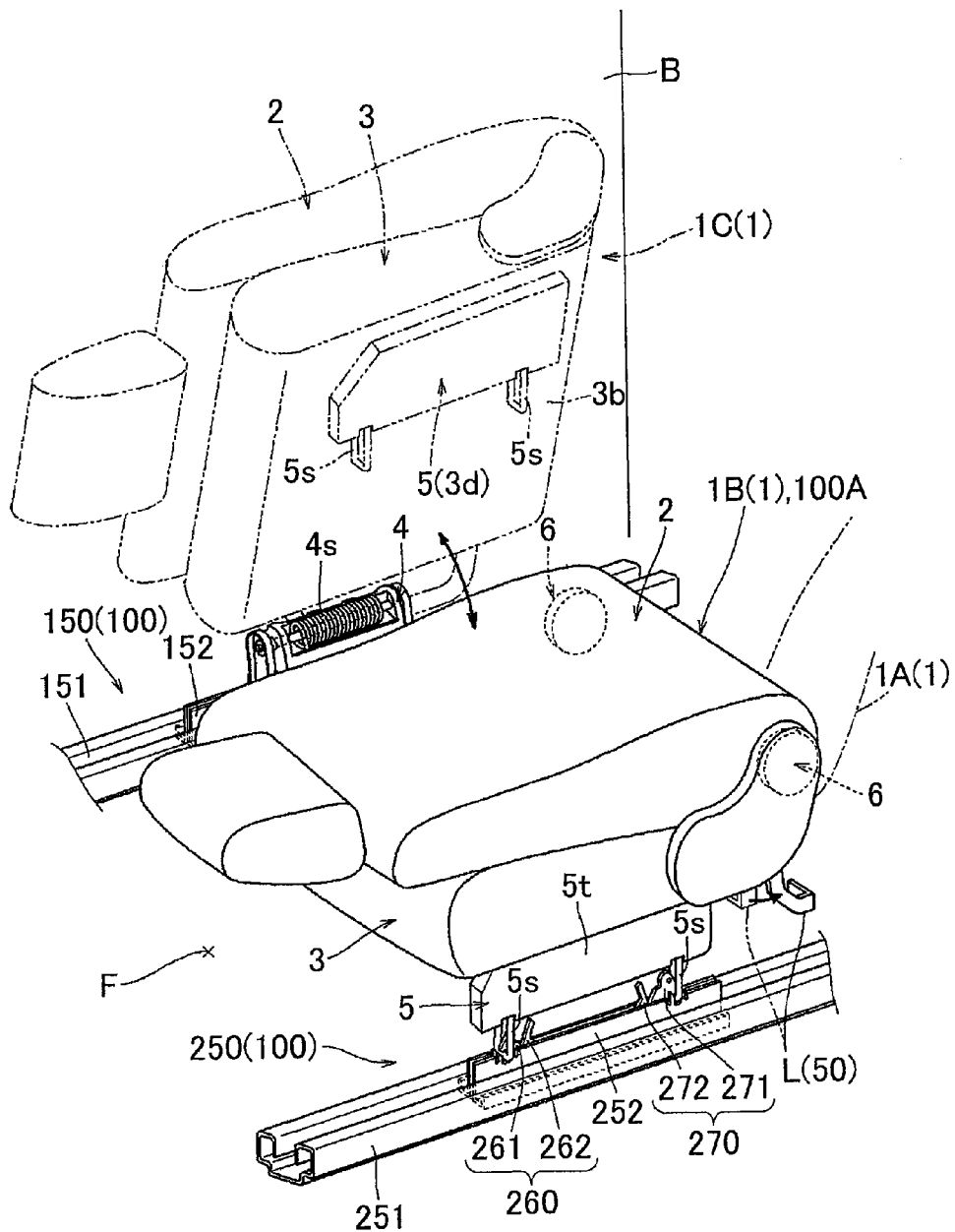
FIG. 1 is a perspective view schematically showing the construction of a vehicle seat according to one embodiment of the invention.

A vehicle seat according to one embodiment of the invention will be described with reference to FIG. 1 through FIG. 20. Directions indicated by arrows as needed in FIG. 2 through FIG. 20 represent the forward and rearward directions of the vehicle that employs the vehicle seat, upward and downward directions, and inward and outward directions as viewed in the vehicle width direction, respectively. For easy understanding of the construction of this embodiment, the internal structure of the vehicle seat is mainly illustrated in FIG. 2 through FIG. 20. To illustrate a seat back 2 and a seat cushion 3, a framework structure, including a seat back frame 2f and a seat cushion frame 3f which constitute a framework of the seat, is mainly depicted, and exterior components, such as skins and seat pads, mounted on the framework structure, are not depicted. To illustrate various mechanisms or assemblies, such as a first slide mechanism 150 and a second slide mechanism 250, installed at both sides of the seat cushion frame 3f, links, spring members, hooks, strikers, and other components are mainly depicted, and exterior components, such as shields, mounted on the mechanisms are not depicted.

Initially, the operation of the vehicle seat according to this embodiment will be briefly described with reference to FIG. 1-FIG. 3. The vehicle seat is installed as a rear seat of the vehicle as shown in FIG. 1, and has a seat back 2 as a backrest portion, and a seat cushion 3 as a seating portion. The seat back 2 and the seat cushion 3 constitute a seat body 1. The seat back 2 is connected with the seat cushion 3, by means of reclining devices 6, 6 provided at lower portions of both sides of the seat back 2 as viewed in the width direction thereof. With the reclining devices 6, 6 thus provided, the reclining angle of the seat back 2 relative to the seat cushion 3 can be adjusted, and the seat back 2 can be tilted forward and folded or superimposed on the seat cushion 3. Thus, the seat body 1 can be selectively placed in two positions, i.e., a standing position 1A in which the seat back 2 stands generally upright relative to the seat cushion 3, and a forward-tilted position or flat position 1B into which the seat back 2 is tilted forward and folded on the seat cushion 3.

As shown in FIG. 2, the reclining devices 6, 6 are normally held in locked positions in which the reclining angle of the seat back 2 is fixed. A reclining lever R (routing of its cable is not illustrated) is installed on the right-hand side (the outer side in FIG. 2) of the seat cushion 3. When the reclining lever R is turned and operated, the reclining devices 6, 6 are unlocked so that the reclining angle of the seat back 2 can be adjusted as desired. An operating lever mechanism 50 having an operating lever L is installed at a lower position on the left-hand side (the inner side in FIG. 2) of the seat cushion 3. When the operating lever L is pulled rearward (or turned), the reclining devices 6, 6 are simultaneously released from the locked positions, or unlocked. Operating parts of locking mechanisms in the reclining devices 6, 6 are connected to each other via a rod 6x, and the right and left reclining devices 6, 6 are synchronously locked and unlocked. Accordingly, when the operating lever L is pulled rearward, the reclining devices 6, 6 are simultaneously unlocked, such that the reclining angle of the seat back 2 is no longer fixed, and the seat back 2 is placed in the forward-tilted position 1B (see FIG. 1).

As shown in FIG. 2, a spring member 2s is mounted between the seat back 2 and the seat cushion 3. The spring member 2s is normally biased in such a direction as to rotate the seat back 2 forward. Accordingly, if the operating lever L is pulled rearward in a condition where no passenger is seated in the seat body 1, the seat back 2 is automatically tilted forward under the bias force of the spring member 2s, and is folded onto the seat cushion 3. The reclining devices 6, 6 are normally biased in a direction in which they are placed in the locked positions; therefore, when the operating lever L stops being operated, the reclining devices 6, 6 are automatically returned to the locked positions. More specifically, each of the reclining devices 6, 6 is provided with a lock zone in which the reclining device 6 is returned to the locked position when the operating lever L stops being operated, and a free zone in which the reclining device 6 is not returned to the locked position even if the operating lever L stops being operated.

The above-mentioned lock zone is set to an angular range over which a passenger seated in the seat body 1 uses the seat back 2 as a backrest. Namely, the lock zone is set to a range between a position at which the seat back 2 is in the standing position 1A (see FIG. 1) in which the seat back 2 stands generally upright relative to the seat cushion 3, and a position at which the seat back 2 is tilted rearward as much as possible. The above-mentioned free zone is set to an angular range over which no passenger is seated in the seat body 1. Namely, the free zone is set to a range between the position at which the seat back 2 1 is in the standing position 1A (see FIG. 1), and a position at which the seat back 2 is in the forward-tilted position 1B (see FIG. 1) in which the seat back 2 is tilted forward as much as possible. Accordingly, if the operating lever L is pulled rearward so as to tilt the seat back 2 forward, and the seat back 2 is inclined forward of the standing position 1A, the seat back 2 will be automatically brought into the forward-tilted position or flat position 1B (see FIG. 1) even if the operating lever L stops being operated.

Figure 3:
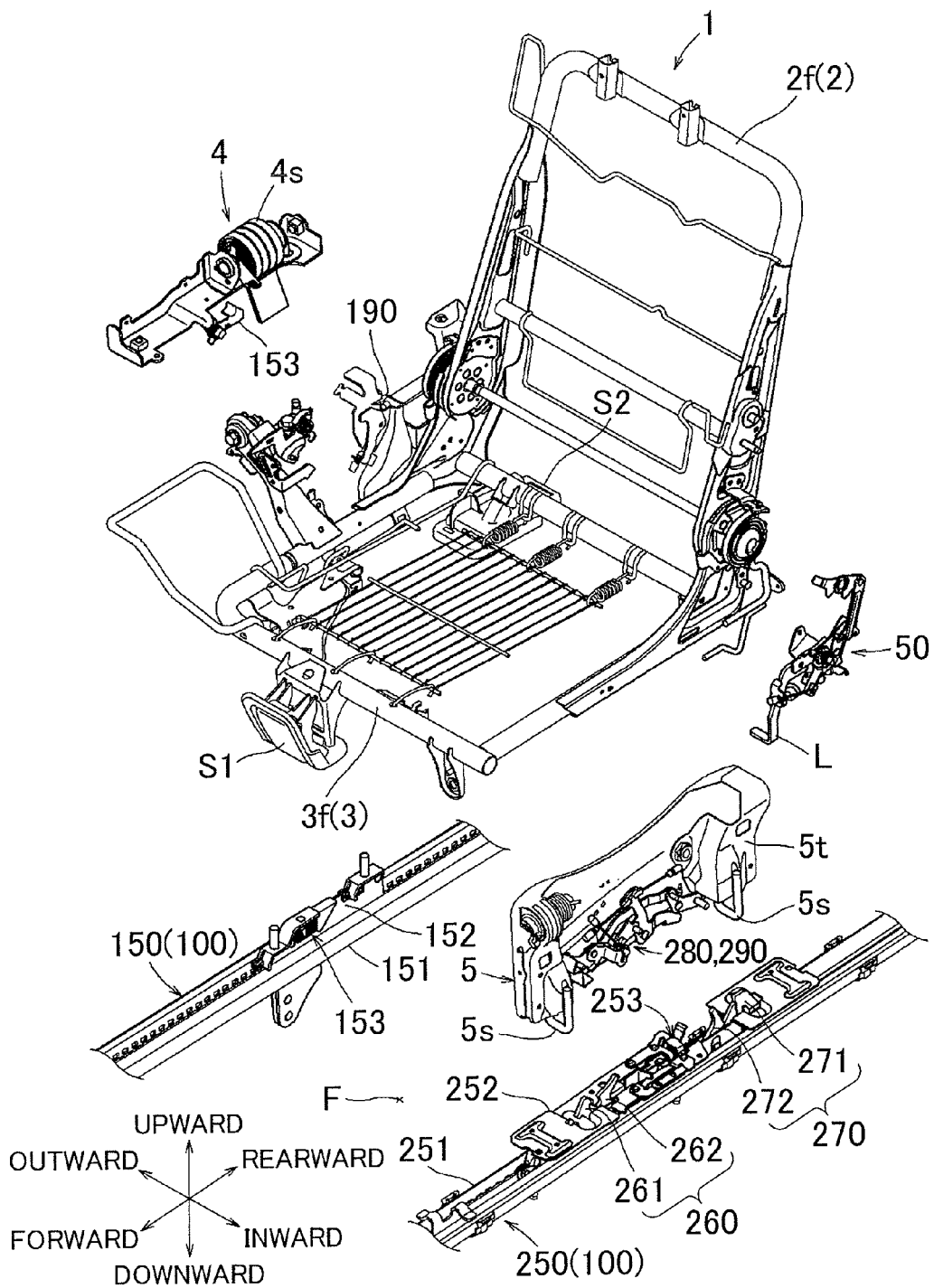
FIG. 3 is an exploded perspective view mainly showing the framework structure of the vehicle seat according to the embodiment of FIG. 1.

As shown in FIG. 3, a slide mechanism 100 is installed between the seat body 1 as described above, and a member (such as a floor F) that constitutes the vehicle body. The slide mechanism 100 makes the position of the seat body 1 relative to the floor F as viewed in the longitudinal direction of the vehicle adjustable. The slide mechanism 100 consists of a pair of first slide mechanism 150 and second slide mechanism 250 disposed between the seat cushion 3 and the floor F (or vehicle-body constituent member). The first slide mechanism 150 and the second slide mechanism 250 are located on both sides of the seat body 1, to extend in parallel with the longitudinal direction of the vehicle. The first slide mechanism 150 is located on one side of the seat body 1 closer to a side wall of the vehicle compartment. The first slide mechanism 150 is provided with a rotation hinge mechanism 4 having a coil spring 4s for flipping up the seat body 1 toward the side wall of the vehicle compartment. The coil spring 4s function as the "biasing member" of the invention. The second slide mechanism 250 is disposed inwardly of the first slide mechanism 150 in the vehicle compartment. The second slide mechanism 250 is provided with a support mechanism 5 for supporting the seat body 1, and flip-up locking devices 260, 270 for locking the seat body 1 and the second slide mechanism 250 that are coupled to each other, or unlocking the seat body 1 and the second slide mechanism 250 so that they can be decoupled from each other. The flip-up locking devices 260, 270 function as the "coupling/decoupling switching mechanism" of the invention. The first slide mechanism 150 has a lower rail 151, an upper rail 152, and a first slide locking device 153. The second slide mechanism 250 has a lower rail 251, an upper rail 252, and a second slide locking device 253. The lower rails 151, 251 extend in the longitudinal direction of the vehicle, and are mounted on the vehicle-body constituent member (floor F in this embodiment). The upper rails 152, 252 are mounted on members that constitute the seat body 1, and are fitted in the lower rails 151, 251 such that the upper rails 152, 252 are slidable in the longitudinal direction relative to the lower rails 151, 251. With this arrangement, the position of the seat body 1 is moved in the longitudinal direction of the vehicle, in accordance with sliding movements of the upper rails 152, 252. The first slide locking device 153 and the second slide locking device 253 are arranged to operate in conjunction with each other, so as to selectively inhibit and permit sliding movements of the upper rails 152, 252. In this embodiment, the first slide locking device 153 and the second slide locking device 253 function as the "slide locking mechanism" of the invention.

As shown in FIG. 3, the upper rails 152, 252 are normally held in slide locked positions in which sliding movements of the upper rails 152, 252 are inhibited by the first slide locking device 153 and the second slide locking device 253. In the meantime, there are two forms of operation for sliding the seat body 1. In a first form of operation, a slide lever S1 or S2 provided on the seat body 1 is operated so as to slide the seat body 1. This form of operation is used for sliding the seat body 1 during its normal use (or sliding the seat body 1 while it is in the standing position 1A). When the slide lever S1, S2 is operated, the first slide locking device 153 and the second slide locking device 253 are operated to release the upper rails 152, 252 from the slide locked positions at the same time and bring the upper rails 152, 252 into slidable conditions. While the slide lever S1, S2 is being operated, the upper rails 152, 252 are moved to slide in the longitudinal direction of the vehicle, so as to adjust the position of the seat body 1. Then, if the slide lever S1, S2 stops being operated, the first slide locking device 153 and the second slide locking device 253 return to their slide locking positions, and the seat body 1 is held in the position thus adjusted. In a second form of operation, the operating lever L of the operating lever mechanism 50 provided on the seat body 1 is operated to slide the seat body 1. This form of operation is used when the seat body 1 is to be stored while facing the inner wall of the vehicle compartment (or for sliding the seat body 1 in the forward-tilted position 1B). When the operating lever L is operated, the seat back 2 is placed in the forward-tilted or generally flat position 1B (see FIG. 1). At the same time, the upper rails 152, 252 are simultaneously released from the slide locked positions established by the first slide locking device 153 and the second slide locking device 253, and are switched or brought into slidable conditions. While the operating lever L is being operated, the upper rails 152, 252 are moved to slide in the longitudinal direction of the vehicle, so as to move the seat body 1 to a flip-up position 100A (see FIG. 1). The flip-up position 100A (see FIG. 1) is a predetermined position at which the seat body 1 is flipped up toward a side wall of the vehicle compartment, within slidable ranges in which the upper rails 152, 252 can slide. In this embodiment, the second slide mechanism 250 includes a flip-up position detecting unit that detects the flip-up position 100A (see FIG. 1). When the seat body 1 is moved to the flip-up position 100A, the first slide locking device 153 and the second slide locking device 253 are placed again in the slide locking positions. The specific arrangements of the first slide mechanism 150, second slide mechanism 250, and the flip-up position detecting unit will be described in detail later.

An operating mechanism is provided for operating the flip-up locking devices 260, 270 (coupling/decoupling switching mechanism), and the first slide locking device 153 and second slide locking device 253, in conjunction with each other. More specifically, the operating mechanism includes a flip-up locking device operating mechanism 280 for operating the flip-up locking devices 260, 270, a first slide locking device operating mechanism 190 for operating the first slide locking device 153, and a second slide locking device operating mechanism 290 for operating the second slide locking device 253. The flip-up locking device operating mechanism 280, first slide locking device operating mechanism 190, and the second slide locking device operating mechanism 290 function as the "operating mechanism" of the invention. The operating lever mechanism 50 is operable to detect that the seat body 1 is in the forward-tilted position 1B. When the operating lever mechanism 50 detects that the seat back 2 is in the forward-tilted position 1B, the operations of the flip-up locking device operating mechanism 280, first slide locking device operating mechanism 190 and the second slide locking device operating mechanism 290 are started. In this embodiment, the operating lever mechanism 50 functions as "the forward-tilted position detecting unit" of the invention. If the flip-up position detecting unit detects the seat body 1 in the flip-up position 100A (see FIG. 1), the operating mechanisms 280, 190, 290 operate in conjunction with each other, so as to unlock the flip-up locking devices 260, 270, and place the first slide locking device 153 and the second slide locking device 253 in the slide locking positions. Thus, when the seat body 1 is located at the flip-up position 100A (see FIG. 1), the seat body 1 is automatically flipped up.

In this embodiment, the seat body 1 is pivotally supported on the first slide mechanism 150 and the second slide mechanism 250, such that the seat body 1 can be raised away from or tilted down toward the floor F, as shown in FIG. 1. More specifically, a left-hand side portion (in FIG. 1) of the seat cushion 3 of the seat body 1 is pivotally hinge-connected to the upper rail 152 by means of the rotation hinge mechanism 4. Also, a right-hand side portion of the seat cushion 3 of the seat body 1 is supported on the upper rail 252 via the support mechanism 5 having a flat support plate 5t, such that the seat cushion 3 can be engaged with or disengaged from the upper rail 252. With the support mechanism 5 thus provided, the seat body 1 is normally held in a position in which the seat cushion 3 is engaged with the upper rail 252 and is laid over the floor F. When the operating lever L of the operating lever mechanism 50 is pulled rearward, the seat back 2 is switched to the forward-tilted position 1B. At this time, the operating lever mechanism 50 detects that the seat back 2 is in the forward-tilted position 1B. Then, the flip-up locking device operating mechanism 280, the first slide locking device operating mechanism 190 and the second slide locking device operating mechanism 290 start operating, to release the slide locks on the upper rails 152, 252 established by the first slide locking device 153 and the second slide locking device 253, and bring the seat body 1 into a slidable condition. Then, the seat body 1 is caused to slide to the flip-up position 100A (see FIG. 1). If the flip-up position detecting unit detects the seat body 1 placed in the flip-up position 100A, the first slide locking device 153 and the second slide locking device 253 are switched back to the slide locking positions, and the flip-up locking devices 260, 270 are switched to unlocking positions in which the second slide mechanism 250 and the seat body 1 can be decoupled from each other. With the flip-up locking devices 260, 270 placed in the unlocking positions, the seat body 1 is flipped up under the bias force of the coil spring 4s of the rotation hinge mechanism 4, and is placed in a storage position 1C in which the seat body 1 is stored while facing the inner wall of the vehicle compartment. With the seat body 1 thus placed in the storage position 1C, free space appears above the floor F where the seat body 1 was installed, and the installation space can be utilized as cargo space, or for other purposes.

On the other hand, if the operating lever L is released while the seat back 2 is being tilted forward, the seat body 1 is held in the forward-tilted position 1B, and remains right above the floor F. When the seat back 2 is in the forward-tilted position 1B, the back surface of the seat back 2 (i.e., the upper surface of the folded seat body 1) can be used as a table top. Thus, in this embodiment, a single rotating operation on the operating lever L results in two different conditions, i.e., a condition where the seat body 1 held in the folded position remains right above the floor F, and a condition where the seat body 1 is disengaged from the floor F to be flipped up to the storage position, and the user can select one of these conditions.

The left-hand side portion (in FIG. 1) of the seat body 1 is pivotally supported by the hinge mechanism 4 such that the seat body 1 can be raised away from or tilted down toward the floor F. The coil spring 4s that urges the seat body 1 in such a direction as to raise the seat body 1 away from the floor F is mounted in the hinge mechanism 4. Accordingly, when the flip-up lock on the support mechanism 5 and the upper rail 252, at the right-hand side portion of the seat body 1, is released, the seat body 1 is raised up away from the floor F under the bias force of the coil spring 4s, and is held in a standing posture at a position facing the vehicle wall B.

The support mechanism 5 is provided on a bottom 3b of the seat cushion 3, such that it can be stored and deployed as needed. When the seat body 1 in the raised position is tilted down toward the floor F, the support mechanism 5 is brought into a standing position, so as to support the seat body 1 above the floor F. More specifically, the flat support plate 5t of the support mechanism 5 is pivotally hinge-connected to the bottom 3b of the seat cushion 3. The support plate 5t is normally urged to be deployed in such as direction as to stand upright relative to the bottom 3b of the seat cushion 3. Accordingly, when the seat body 1 is tilted down toward the floor F, the support plate 5t hangs down straight from the bottom 3b of the seat cushion 3, to be placed in the deployed position under the bias force, so as to support the seat body 1 from below the bottom 3b, in position relative to the floor F. When the seat body 1 is raised up away from the floor F, the support plate 5t is pulled by a pulling member (not shown), such as a wire routed from the vehicle body, in coordination with the movement of the seat body 1, so that the support plate 5t is folded on the bottom 3b of the seat cushion 3 and stored in a storage recessed portion 3d.

As shown in FIG. 1, strikers 5s, 5s are provided at respective distal ends (or lower ends) of front and rear portions of the support plate 5t, and the strikers 5s, 5s can respectively engage with hooks 261, 271 of the flip-up locking devices 260, 270 installed on the upper rail 252. Upon falling or tilting-down of the seat body 1 toward the floor F, the strikers 5s, 5s are brought into abutment with the corresponding hooks 261, 271, and the seat body 1 is further pushed down in such a direction as to engage the strikers 5s, 5s with the hooks 261, 271, so that the seat body 1 is locked in this condition.

Accordingly, the seat body 1 is held in the locked condition in which the seat body 1 cannot be raised up from the floor F due to the engagement of the strikers 5s, 5s with the hooks 261, 271. The engagement of the hooks 261, 271 with the strikers 5s, 5s (or the locks on the hooks 261, 271 and the strikers 5s, 5s) can be released by pulling the above-described operating lever L rearward. As a result, the seat body 1 is raised up away from the floor F, under the bias force of the coil spring 4s provided in the hinge mechanism 4, to be placed in the storage position 1C in which the seat body 1 stands up at the position facing the vehicle wall B.

Figure 4:
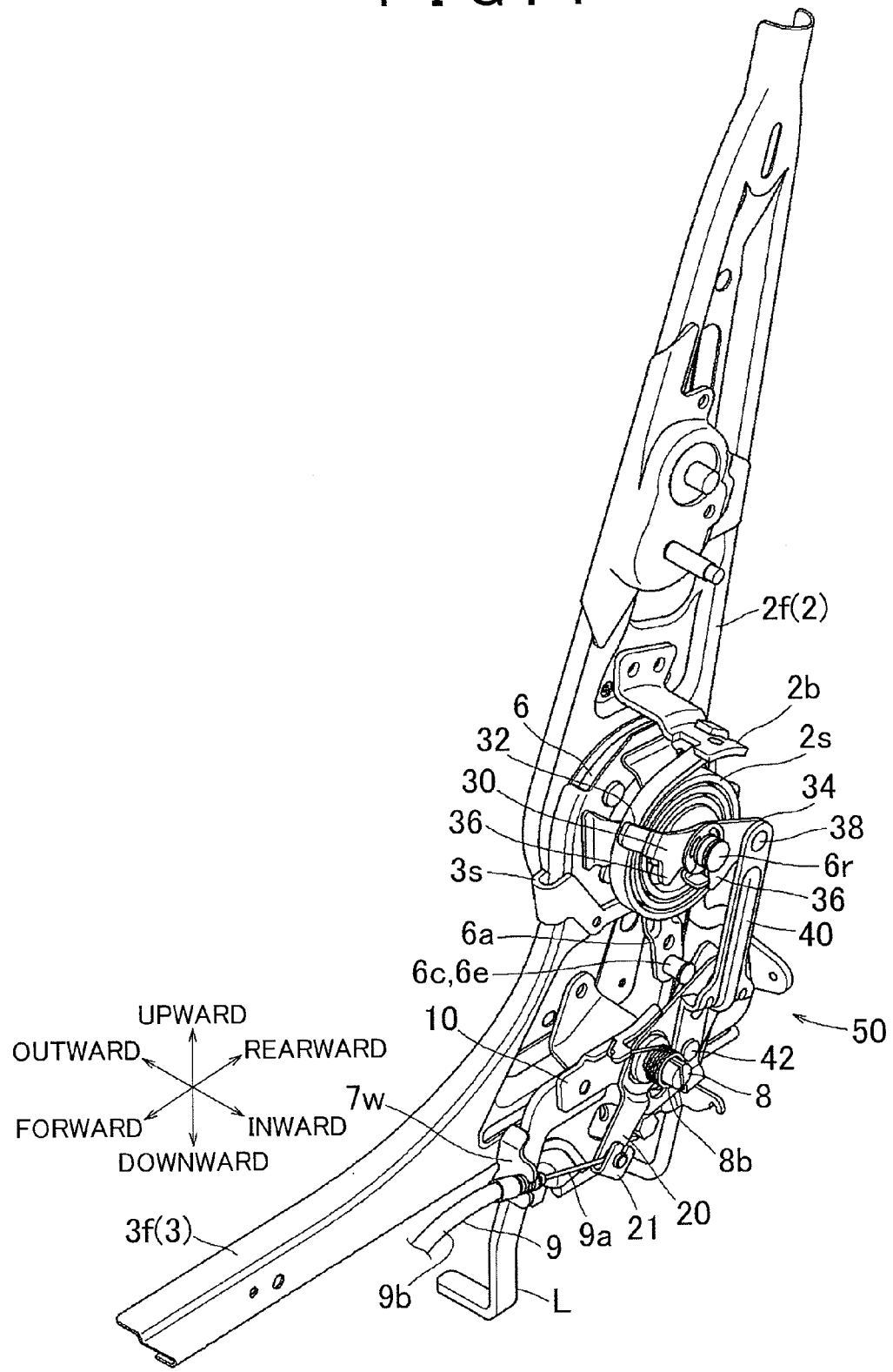
FIG. 4 is a partial perspective view showing an operating lever mechanism of the vehicle seat according to the embodiment of FIG. 1.
Figure 5:
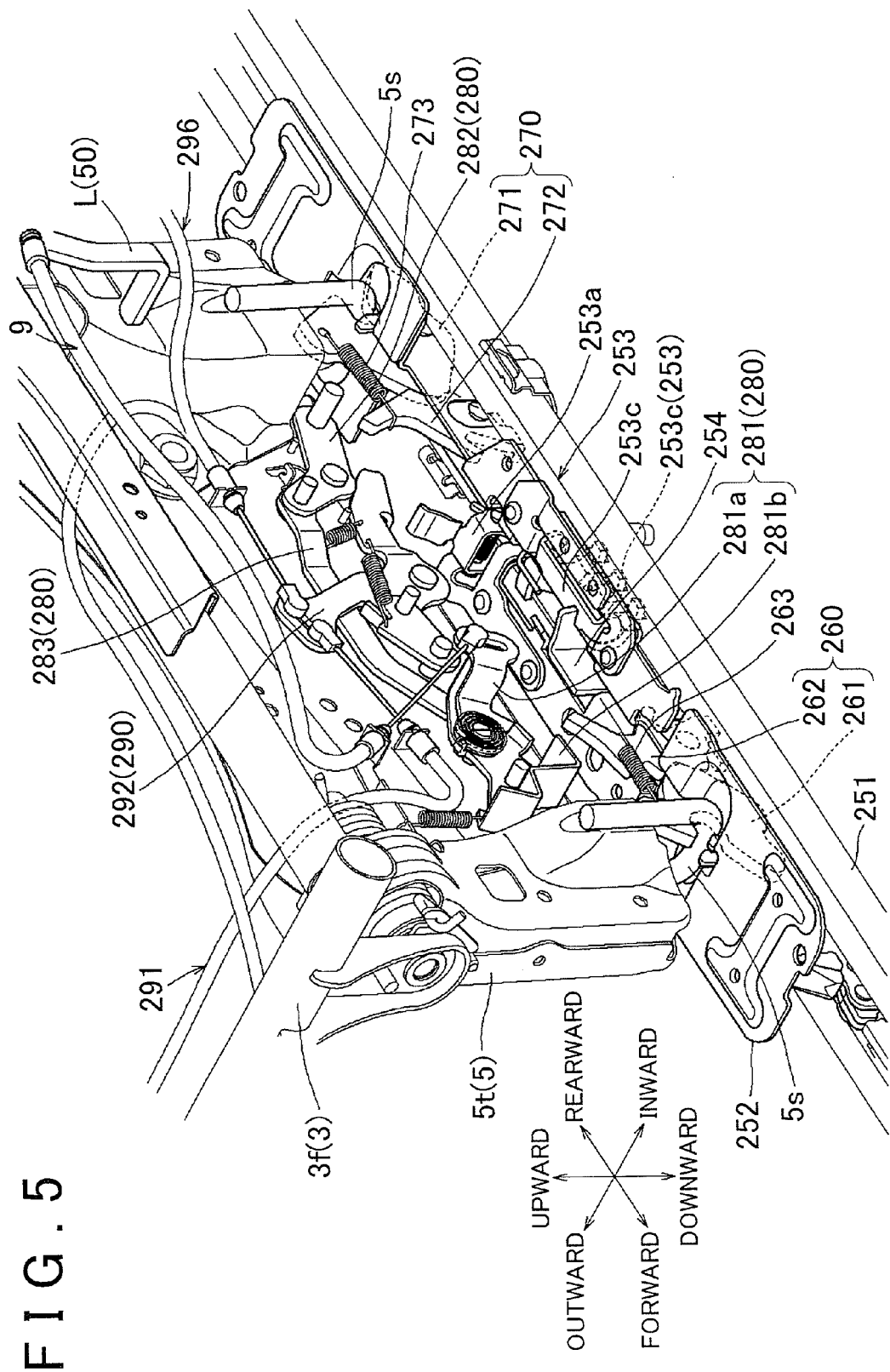
FIG. 5 is a partial perspective view showing a support mechanism on the inner side of the vehicle seat according to the embodiment of FIG. 1.

Next, the construction of the operating lever mechanism 50 will be described with reference to FIG. 4 and FIGS. 11-14. As shown in FIG. 4, the operating lever mechanism 50 is mounted on the cushion frame 3f. When the operating lever L is pulled rearward, the operating lever mechanism 50 rotates a switching shaft 6r that protrudes from one of the reclining devices 6 shown in FIG. 4, so as to simultaneously unlock the reclining devices 6, 6.

Figure 11:
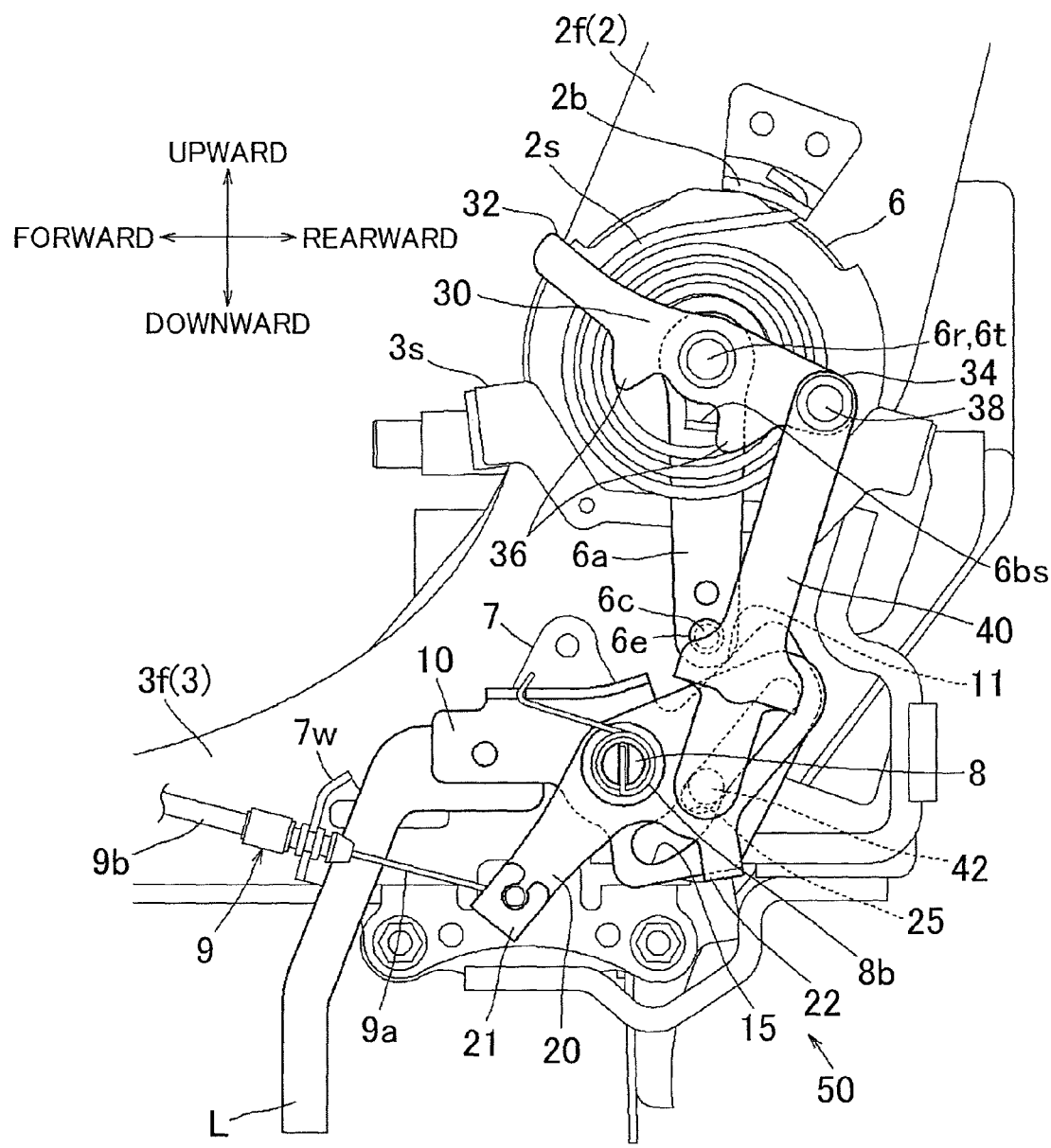
FIG. 11 is a view illustrating an initial position of an operating lever mechanism of the vehicle seat according to the embodiment of FIG. 1.
Figure 12:
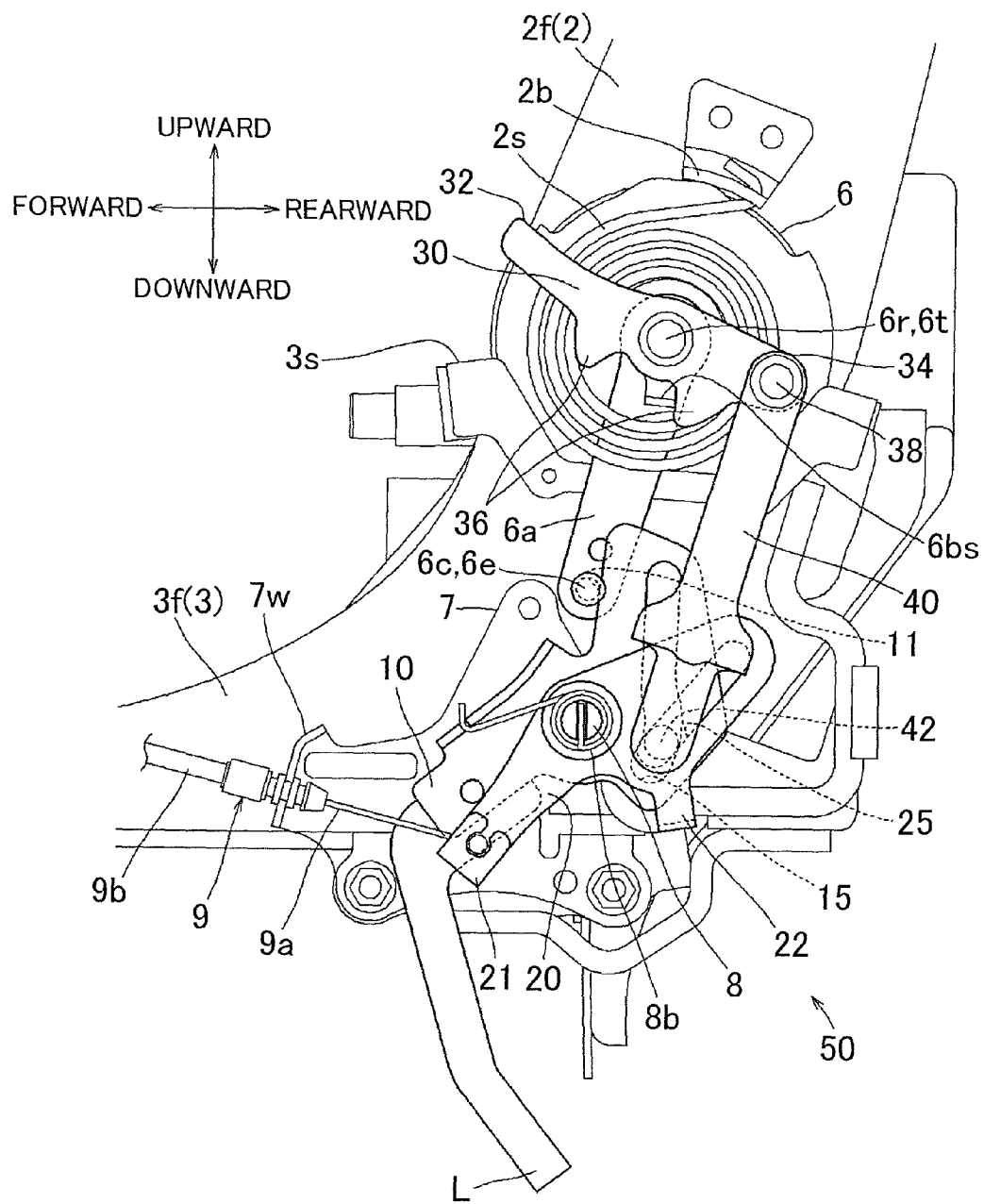
FIG. 12 is a view illustrating an operating condition where an operating lever of the operating lever mechanism of the vehicle seat according to the embodiment of FIG. 1 is operated.
Figure 13:
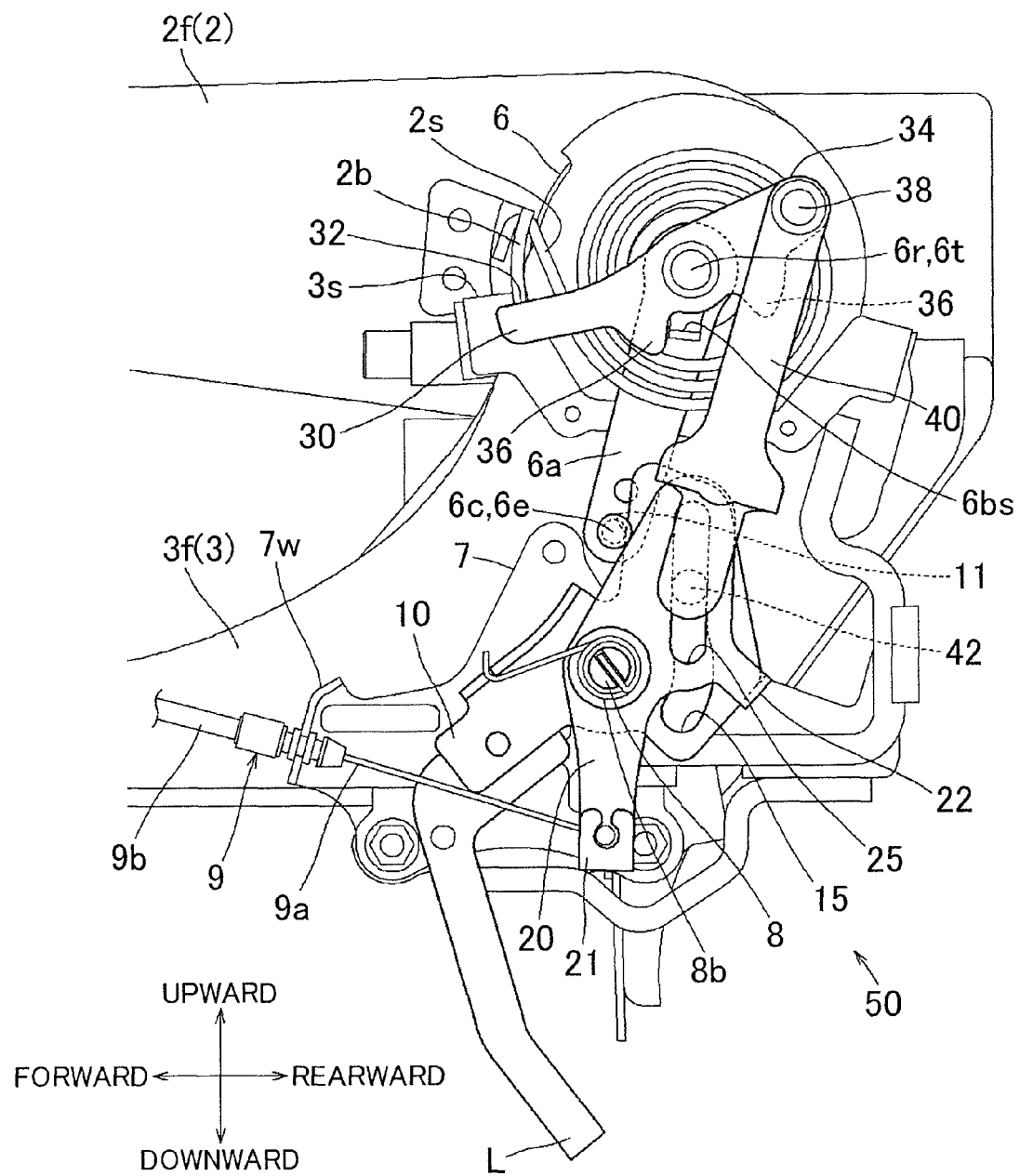
FIG. 13 is a view illustrating an operating condition where a seat back is placed in a forward-tilted position as the operating lever of the operating lever mechanism of the vehicle seat according to the embodiment of FIG. 1 is operated.
Figure 14:
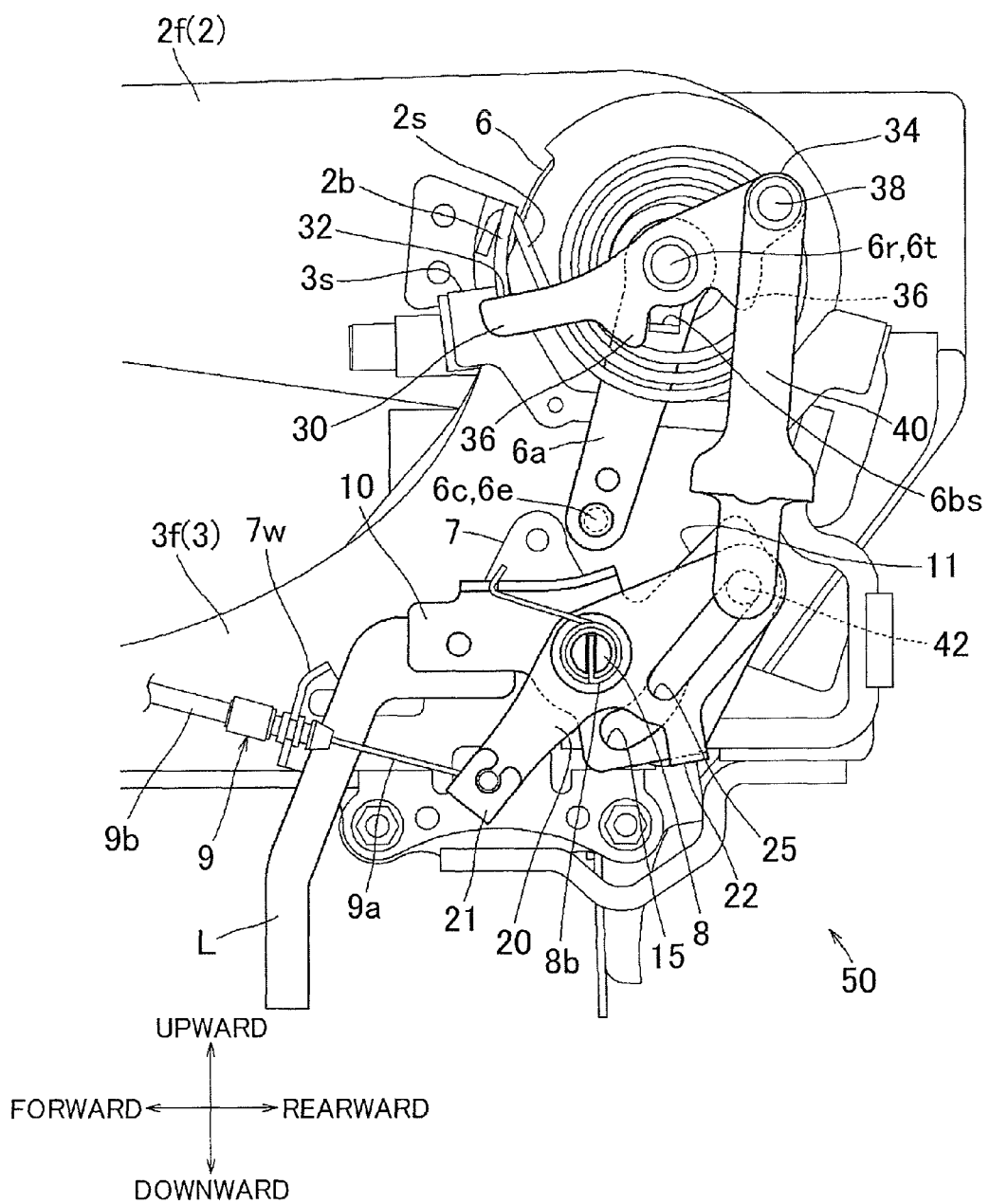
FIG. 14 is a view illustrating an operating condition where the operating lever of the operating lever mechanism of the vehicle seat according to the embodiment of FIG. 1 is returned.

The reclining device 6 located on the inner side of the vehicle and shown in FIG. 4 and FIGS. 11-14 is sandwiched between a plate that constitutes the seat back frame 2f, and a plate that constitutes the seat cushion frame 3f, so as to connect the seat back frame 2f and the seat cushion frame 3f with each other. The switching shaft 6r for switching the reclining devices 6, 6 between the locked position and the unlocked position extends through the reclining device 6 in the thickness direction so as to protrude outwardly of the seat cushion frame 3f. A switching arm 6a is fitted on a distal end portion of the switching shaft 6r which protrudes from the seat cushion frame 3f, such that the switching arm 6a and the switching shaft 6r can rotate as a unit or integrally. The switching shaft 6r is inserted through the switching arm 6a, and a retainer ring 6t is mounted on the switching shaft 6r from outside in the width direction, so as to inhibit the switching arm 6a from being pulled out of the switching shaft 6r. With this arrangement, the switching shaft 6r rotates in accordance with rotation of the switching arm 6a, so as to switch the reclining devices 6, 6 between the locked positions and the unlocked positions. More specifically, the switching arm 6a is normally held in an initial position in which the reclining devices 6, 6 are placed in the locked positions as shown in FIG. 11, under the bias force of spring members (not shown) mounted on the reclining devices 6, 6. When the operating lever L is operated as shown in FIG. 12, the switching arm 6a is rotated in the clockwise direction, thereby to rotate the switching shaft 6r and unlock the reclining devices 6, 6. Namely, when the operating lever L is operated to the position indicated in FIG. 12, the switching arm 6a is rotated to the position in which the reclining devices 6, 6 are unlocked. While the reclining devices 6, 6 are unlocked and the seat back 2 is tilted forward, the reclining devices 6, 6 are placed in the respective free zones as described above. Accordingly, even if the operating lever L stops being operated, the switching arm 6a does not return to the initial position, but is held in the position (for unlocking the reclining devices 6, 6) to which the arm 6a has been rotated, as shown in FIG. 14. A rotary bracket 30 is supported on a protruding distal end portion of the switching shaft 6r, such that the rotary bracket 30 is rotatable relative to the switching shaft 6r. The rotary bracket 30 is formed like a band plate, and a generally central portion of the bracket 30 is rotatably supported on the switching shaft 6r. The rotary bracket 30 has two end portions that extend in radial directions from the switching shaft 6r. One of the end portions of the rotary bracket 30 has an engaging portion 32. When the seat back 2 is tilted forward, the engaging portion 32 engages with a spring-hanging bracket 2b in the form of an L-shaped plate provided integrally on the seat back frame 2f. The other end portion of the rotary bracket 30 has a pin-connected portion 34. A connecting pin 38 is mounted in the pin-connected portion 34 such that the pin-connected portion 34 is rotatable with one end of a transmission link 40 formed like a band plate. When the engaging portion 32 of the rotary bracket 30 engages with the spring-hanging bracket 2b, the transmission link 40 detects the seat back 2 placed in the forward-tilted position 1B, and transmits the detection result to a second bracket 20 which will be described later. The transmission link 40 is foimed at the other end (the lower end in FIG. 11) with a slide pin 42 that protrudes in the thickness direction of the transmission link 40. Also, two engaging portions 36 that protrude in a direction perpendicular to the longitudinal direction of the rotary bracket 30 are formed between the engaging portion 32 of the rotary bracket 30 and the switching shaft 6r, and between the pin-connected portion 34 and the switching shaft 6r. In operation, the engaging portions 36, 36 of the rotary bracket 30 abut on a stopper 6bs secured to the switching shaft 6r, so that the angle of rotation of the rotary bracket 30 is limited to a given rotational angle.

As shown in FIG. 11, an engaging pin 6c is mounted in a lower end portion of the switching aim 6a. The engaging pin 6c is inserted through the switching arm 6a in the thickness direction thereof, and a cylindrical roller 6e is rotatably fitted on a distal end portion of the engaging pin 6c. The engaging pin 6c is also fixed to a retainer ring (not shown) so as to be inhibited from being pulled out of the switching arm 6a. Thus, the roller 6e fitted on the engaging pin 6c is freely rotatable relative to the engaging pin 6c. The roller 6e mounted on the engaging pin 6c is provided as a functional part or component that receives operating force transmitted from the operating lever L when it is operated or turned.

As shown in FIG. 4 and FIGS. 11-14, functional parts for rotating the switching arm 6a as described above are mounted to the seat cushion frame 3f. More specifically, a forward-tilting stopper 3s for restricting forward tilting of the seat back 2 is formed at a portion connecting the seat cushion frame 3f with the seat back frame 2f. When the seat back 2 is tilted forward, the spring-hanging bracket 2b provided integrally on the seat back frame 2f is pressed against the forward-tilting stopper 3s, so that further movement of the seat back 2 is inhibited. Also, a base plate 7 in the form of a flat plate that provides a mounting base or platform is mounted integrally to the seat cushion frame 3f. The base plate 7 is fastened to the cushion frame 3f. The base plate 7 is formed at a left, lower end portion thereof with a cable-hanging portion 7w for hanging an end portion of an outer member 9b of a first cable 9 which will be described later. The cable-hanging portion 7w is formed by bending a part of the base plate 7.

A first bracket 10 in the form of an aim-like plate member is pivotally connected to the base plate 7 via a pivot 8 such that the first bracket 10 is rotatable about the pivot 8. The pivot 8 is joined integrally to the base plate 7, and rotatably supports the first bracket 10. An end portion of the operating lever L is integrally mounted and fixed to the first bracket 10. With this arrangement, the first bracket 10 is adapted to be rotated integrally with the operating lever L. As shown in FIG. 4 and FIG. 11, a coil spring 8b for urging the first bracket 10 to rotate in the clockwise direction is hung between the first bracket 10 and the base plate 7. One end of the coil spring 8b is fitted in and engaged with a head portion of the pivot 8 integral with the base plate 7, and the other end of the coil spring 8b is engaged with and attached to the first bracket 10. With this arrangement, the first bracket 10 is urged to rotate in the clockwise direction relative to the base plate 7, and abuts on a stopper (not shown) so that the operating lever L is held in a hanging-down position as shown in FIG. 11.

As shown in FIG. 4 and FIG. 11, the first bracket 10 is formed at its arm-shaped distal end portion with an operating portion 11 that can push and operate the roller 6e. The roller 6e is mounted on the engaging pin 6c of the switching arm 6a, as described above. When the operating lever L is turned in the counterclockwise direction, as shown in FIG. 12, the operating portion 11 of the first bracket 10 presses the roller 6e, and pushes and moves the switching arm 6a integrally with the roller 6e. As a result, the switching arm 6a is rotated in the clockwise direction, so as to unlock the reclining devices 6, 6. Also, the first bracket 10 is formed with a first long hole 15 in which the slide pin 42 of the transmission link 40 can slide.

As shown in FIG. 11, the above-mentioned second bracket 20 is also rotatably supported on the pivot 8 on which the first bracket 10 is rotatably supported. The second bracket 20 is formed like a band plate, and a generally middle portion of the bracket 20 is rotatably supported on the pivot 8. The second bracket 20 is formed at one end thereof with a second long hole 25 in which the slide pin 42 of the transmission link 40 can slide. A part of the second long hole 25 is formed in the same shape as a part of the first long hole 15. Thus, when the first long hole 15 of the first bracket 10 and the second long hole 25 of the second bracket 20 do not completely overlap each other, the second bracket 20 rotates following the first bracket 10 so that the first long hole 15 and the second long hole 25 overlap each other, as the slide pin 42 of the transmission link 40 slide in the first and second long holes 15, 25. Also, the second bracket 20 is provided with an engaging piece 22 that extends in the thickness direction. With this arrangement, when the second bracket 20 is rotated in the counterclockwise direction, following the rotation of the first bracket 10, as shown in FIG. 13, the engaging piece 22 abuts on an edge portion of the first bracket 10, so as to limit the angle of rotation of the second bracket 20 to a given angle. The second bracket 20 is formed at the other end with a cable-hanging portion 21 for hanging an end portion of an inner member 9a of the first cable 9. The cable-hanging portion 21 is formed by bending an end portion of the second bracket 20. With this arrangement, when the operating lever L is operated, the second bracket 20 rotates in the direction of rotation of the first bracket 10, following the first bracket 10, as shown in FIG. 13. As a result, the second bracket 20 pulls an end portion of the inner member 9a engaged with the lower end portion thereof, so as to pull the first cable 9 by pulling the inner member 9a out of an end portion of the outer member 9b. As shown in FIG. 14, as the slide pin 42 of the transmission link 40 slides along the first long hole 15 of the first bracket 10 and the second long hole 25 of the second bracket 20 in a condition where the first and second long holes 15, 20 overlap each other (or are aligned with each other), the second bracket 20 rotates about the pivot 8 in synchronism with the first bracket 10, and returns to the initial position (as shown in FIG. 11).

As shown in FIG. 11, the first cable 9 has a double structure in which the wire-like inner member 9a is inserted through the tubular outer member 9b. One end of the inner member 9a is integrally engaged with the second bracket 20, and one end of the outer member 9b is integrally engaged with the base plate 7. The other ends of the inner member 9a and outer member 9b are engaged with the flip-up locking device operating mechanism 280 as an operating mechanism for disengaging the hooks 261, 271 from the strikers 5s, 5s (releasing the lock on the hooks 261, 271 and the strikers 5s, 5s) as described above with reference to FIG. 3. Accordingly, when the inner member 9a is pulled outward from the outer member 9b at one end of the first cable 9, the flip-up locking device operating mechanism 280 operates to release the hooks 261, 271 from the locked positions (i.e., unlock the flip-up locking devices 260, 270). As shown in FIG. 11, when the second bracket 20 engaged with one end of the inner member 9a is in the initial position (namely, before the second bracket 20 is rotated), holding force for holding the second bracket 20 in the initial position is applied from the flip-up locking device operating mechanism 280 to the second bracket 20 via the inner member 9a, so that the second bracket 20 is held in the initial rotational position as shown in FIG. 11.

Figure 8:
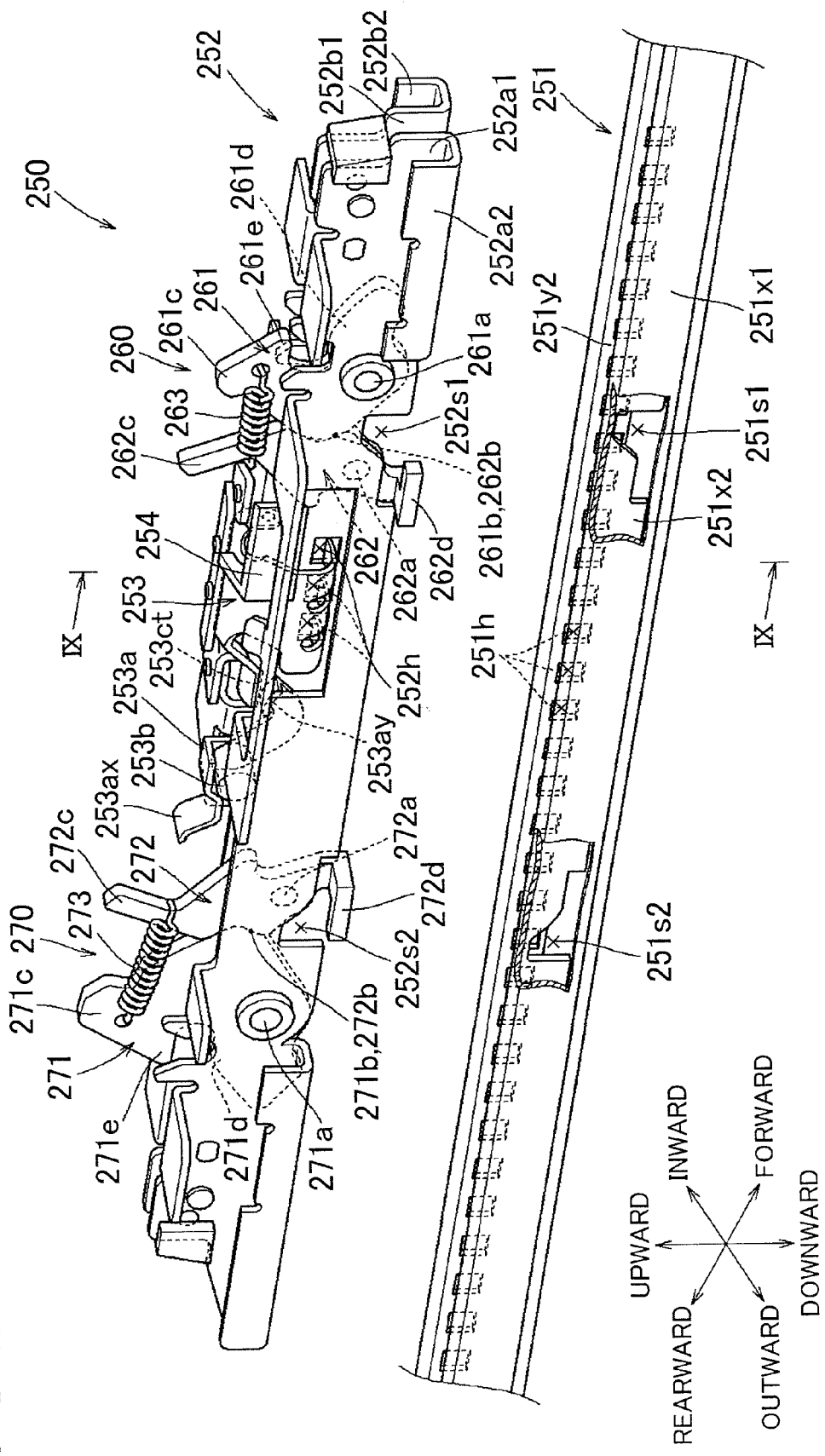
FIG. 8 is a partial perspective view showing in detail a second slide mechanism of the vehicle seat according to the embodiment of FIG. 1.

Next, the construction of the second slide mechanism 250 including the flip-up locking devices 260, 270 as described above will be specifically described with reference to FIGS. 5, 8, 9, 15-18. As shown in FIG. 9, the second slide mechanism 250 is constructed such that the upper rail 252 is guided along the lower rail 251 having a cross section that surrounds the shape of letter "U", such that the upper rail 252 is slidable in the longitudinal direction relative to the lower rail 251. Specifically, the lower rail 251 is formed in a given cross-sectional shape as shown in FIG. 9, by bending a sheet of flat plate made of steel at several locations. More specifically, the cross-sectional shape of the lower rail 251 consists of a bottom portion $251u$ shaped like a flat plate, right-hand side portion $251x1$ and left-hand side portion $251y1$ which rise from both sides of the bottom portion $251u$ and are shaped like flat plates, and right-hand L-shaped portion $251x2$ and left-hand L-shaped portion $251y2$ which extend inward from the upper ends of the right-hand side portion $251x1$ and left-hand side portion $251y1$, respectively, and hang downward. As shown in FIG. 8, a plurality of through-holes $251h$ are formed at equal intervals in the left-hand L-shaped portion $251y$ over the entire length of the lower rail 251, to extend through the L-shaped portion $251y$ in the thickness direction. In two longitudinal regions of the lower rail 251, recesses $251s1, 251s2$ are formed by partially cutting off the bottom of the right-hand L-shaped portion $251x2$. The recesses $251s1, 251s2$ are formed so as to receive leg portions $262d, 272d$ of holding members 262, 272 of the flip-up locking devices 260, 270, respectively, when the holding members 262, 272 are kicked and moved as described later.

On the other hand, the upper rail 252 is formed in a cross-sectional shape as shown in FIG. 9, by bending a sheet of flat plate made of steel at several locations. More specifically, the cross-sectional shape of the upper rail 252 has right-hand side portion $252a1$ and left-hand side portion $252zb1$ that are shaped like flat plates and extend straight downward so as to be opposed to each other, as shown in FIG. 9. Also, as shown in FIG. 8, the cross-sectional shape of the upper rail 252 includes right-hand fin portion $252a2$ and left-hand fin portion $252b2$ that extend outward and upward from the lower ends of the right-hand side portion $252a1$ and left-hand side portion $252b1$, respectively. In two longitudinal regions of the upper rail 252, recesses $252s1, 252s2$ are formed by partially cutting off the right-hand side portion $252a$. The recesses $252s1, 252s2$ are formed in respective shapes corresponding to the shapes of the recesses $251s1, 251s2$ formed in the lower rail 251 as described above, so as to receive the leg portions $262d, 272d$ of the holding members 262, 272 of the flip-up locking devices 260, 270 when the holding members 262, 272 are kicked and moved. In a longitudinally middle portion of the left-hand side portion $252b1$ of the upper rail 252, three through-holes $252h$ are formed at equal intervals along the longitudinal direction, to extend through the side portion $252b1$ in the thickness direction thereof. The interval or pitch of the through-holes $252h$ is equal to that of the through-holes $251h$ formed in the lower rail 251. The right-hand fin portion $252a2$ and the left-hand fin portion $252b2$ are not formed in the middle portion of the upper rail 252 in which the through-holes $252h$ are formed.

The second slide locking device 253 is installed in the middle portion of the upper rail 252 in which the through-holes $252h$ are formed. The second slide locking device 253 has a locking member $253c$ having claws that can be inserted through the through-holes $252h$. More specifically, the locking member $253c$ has three claws, and is rotatably supported on a pivot $253d$ to be connected to the upper rail 252, as shown in FIG. 9. The locking member $253c$ is normally biased in such a direction that its claws are inserted through the through-holes $252h$, under the bias force of a spring member (not shown). Accordingly, when the upper rail 252 that slides on the lower rail 251 is positioned relative to the lower rail 251 during sliding such that the through-holes $252h$ formed in the upper rail 252 are aligned with the through-holes $251h$ formed in the lower rail 251, as shown in FIG. 9, the claws of the locking member $253c$ of the second slide locking device 253 are inserted through the through-holes $252h, 251h$ under the above-mentioned bias force. Thus, the second slide mechanism 250 is held in a slide locked position in which the sliding movement of the upper rail 252 is inhibited.

Figure 15:
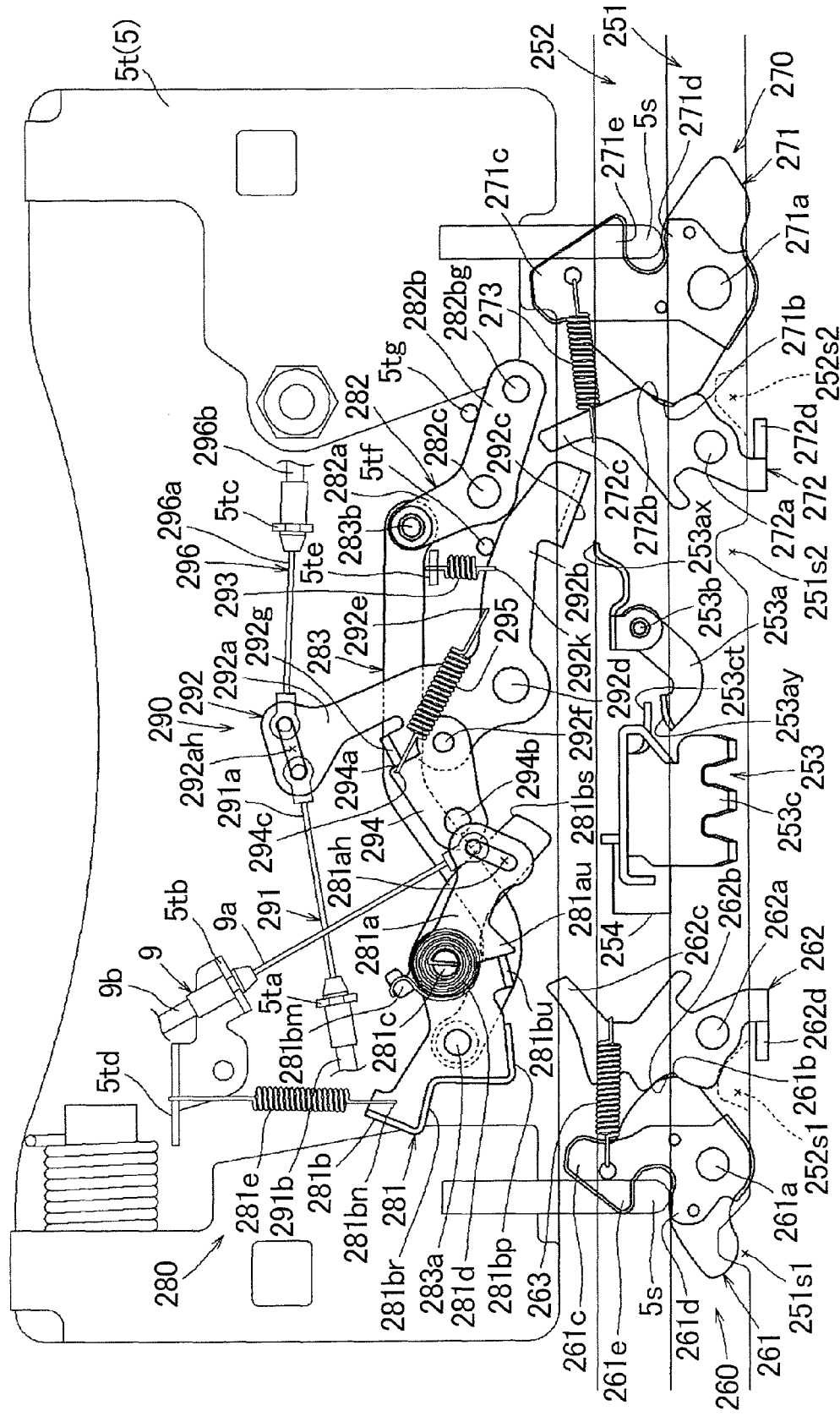
FIG. 15 is a view illustrating the initial positions of a second slide locking device, flip-up locking devices and an operating mechanism of the vehicle seat according to the embodiment of FIG. 1.

The second slide mechanism 250 is unlocked, i.e., released from the slide locked position, when an operating arm $253a$ provided adjacent to the locking member $253c$ is operated to rock, as shown in FIG. 8. As shown in FIG. 15, the operating arm $253a$ is rotatably supported on a pivot $253b$ to be connected to the upper rail 252. The operating arm $253a$ is formed at one distal end with a pushing portion $253ay$ for pushing the locking member $253c$, and is formed at the other distal end with a receiving portion $253ax$. In operation, the receiving portion $253ax$ is pushed by a second L-shaped link 292 of the slide locking device operating mechanism 290 which will be described later. The operating arm $253a$ is biased in a direction opposite to the direction in which the arm $253a$ pushes the locking member $253c$, under the bias force of a spring member (not shown), so as to be held in a position spaced apart from the locking member $253c$. On the other hand, the locking member $253c$ is formed integrally with a protruding plate $253ct$ that is pushed by the pushing portion $253ay$ formed on the operating arm $253a$. With this arrangement, the locking member $253c$ is unlocked, i.e., released from the locking position, when the operating aim $253a$ is operated to rock so that its pushing portion $253ay$ pushes up the protruding plate $253ct$ of the locking member $253c$.

Figure 17:
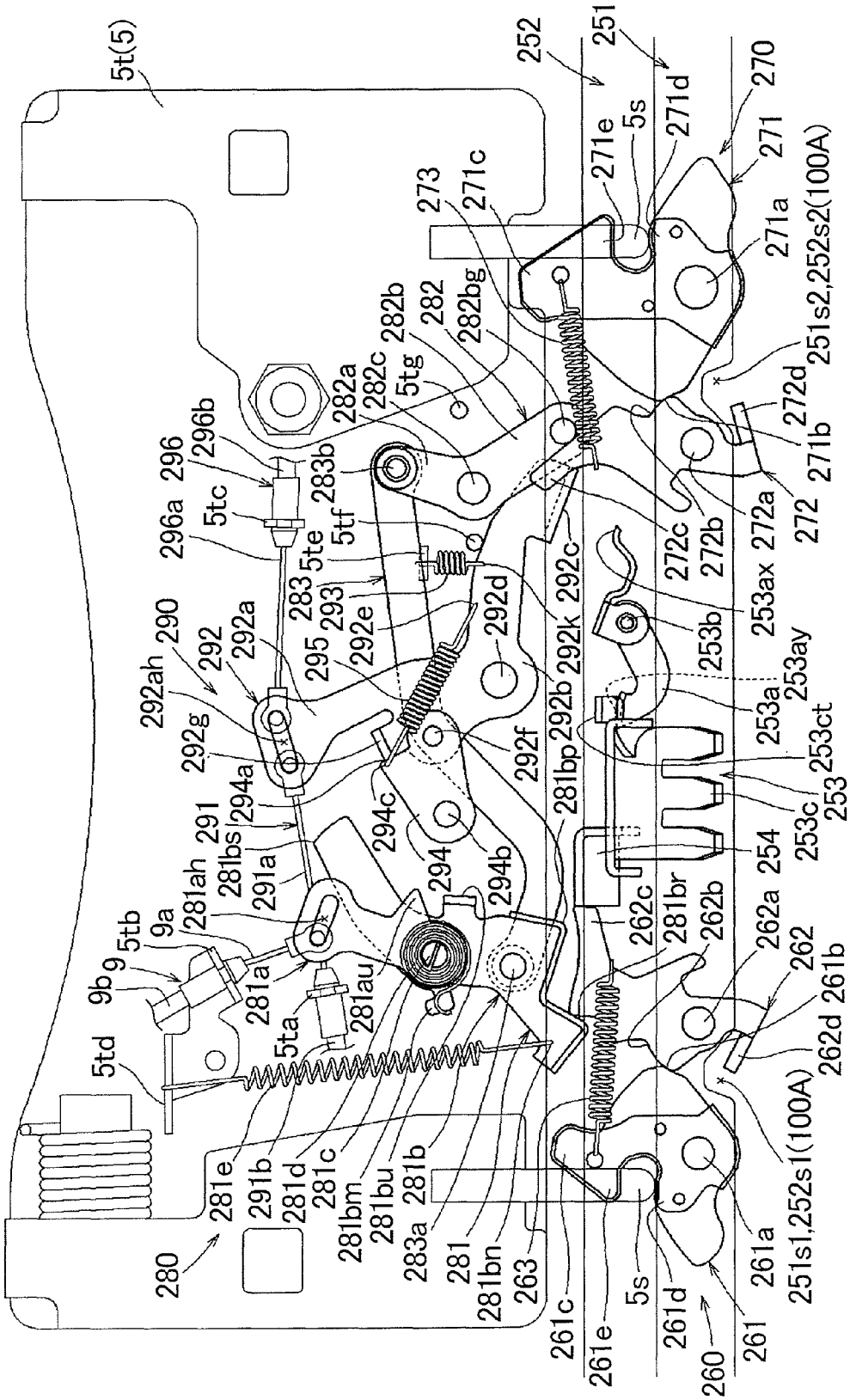
FIG. 17 is a view illustrating an operating condition where the operations of the flip-up locking devices of the vehicle seat according to the embodiment of FIG. 1 are restricted by a restricting mechanism.

Also, a restricting bracket 254 having a generally L-shaped cross section is formed integrally on a back surface of the locking member $253c$ opposite to the side on which the claws are formed, as shown in FIG. 8 and FIG. 9. The restricting bracket 254 is rotated integrally with the locking member $253c$. The restricting bracket 254 is disposed between the holding member 262 of the flip-up locking device 260 as described later, and the locking member $253c$. In a condition where the claws of the locking member $253c$ are inserted through the through-holes $252h, 251h$, the restricting bracket 254 is stored such that its plate portion extends in substantially parallel with the holding member 262 (see FIG. 5 and FIG. 8). However, if the locking member $253c$ is rotated in the releasing direction, the restricting bracket 254 makes its way into the trajectory of rotary motion of a head portion $262c$ of the holding member 252 as shown in FIG. 17. Thus, the restricting bracket 254 is provided as a functional part that restricts rotation of the holding member 262. Namely, the restricting bracket 254 serves as a restricting mechanism for restricting or inhibiting an operation to unlock the flip-up locking devices 260, 270 (the coupling/decoupling switching mechanism) until the first slide locking device 153 and second slide locking device 253 (slide locking mechanism) are completely placed in the slide locking positions.

Figure 18:
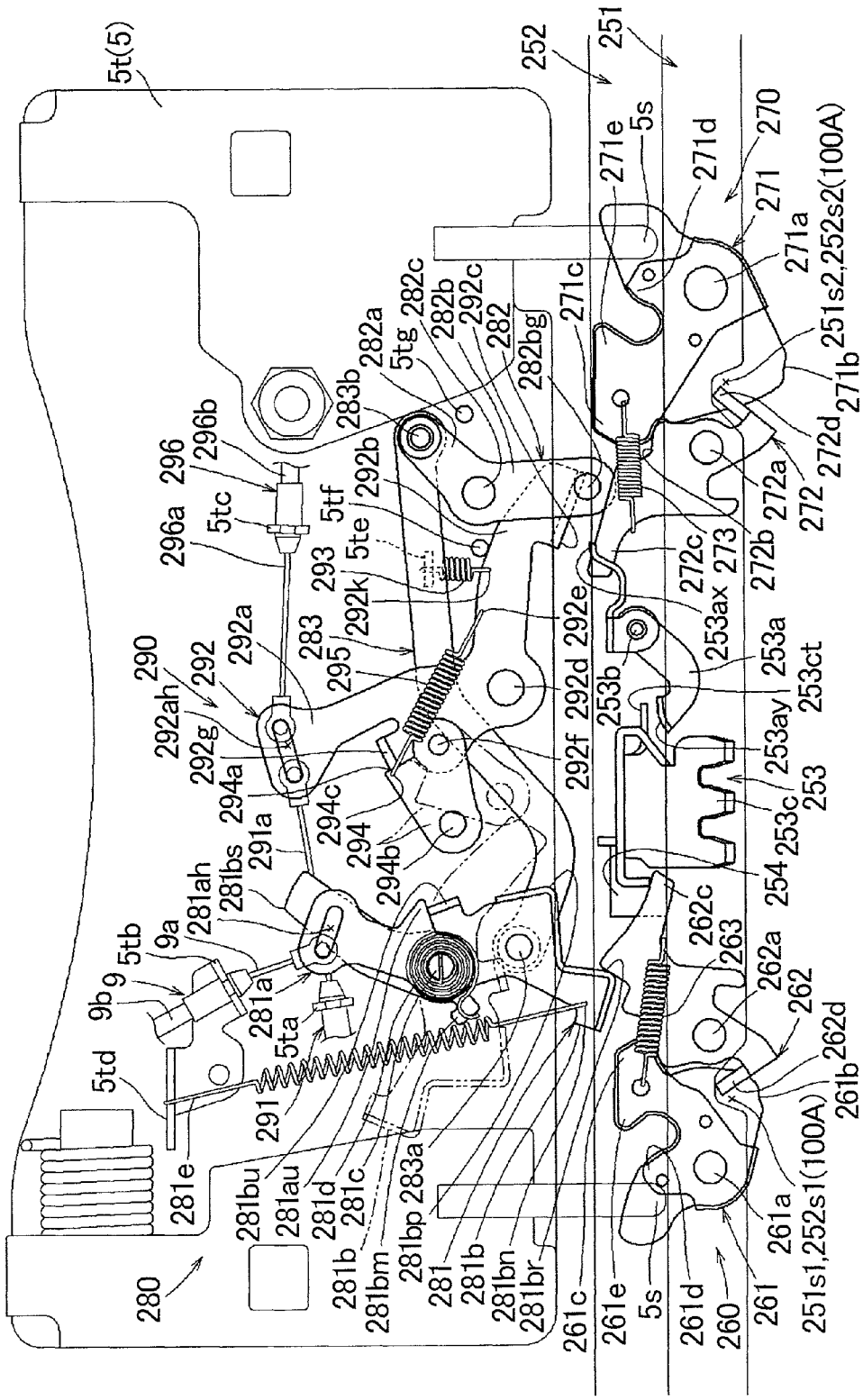
FIG. 18 is a view illustrating an operating condition where the flip-up locking devices of the vehicle seat according to the embodiment of FIG. 1 are unlocked, and the second slide locking device is placed in the slide locking position.

When the upper rail 252 and the lower rail 251 are positioned relative to each other during sliding such that the recesses 252s1, 252s2 formed in the upper rail 252 are aligned with the recesses 251s1, 251s2 formed in the lower rail 251, as shown in FIG. 17 and FIG. 18, the second slide mechanism 250 constructed as described above allows the holding members 262, 272 of the flip-up locking devices 260, 270 to rotate in the releasing directions. Namely, in the condition where the recesses 252s1, 252s2 are aligned with the recesses 251s1, 251s2, the holding member 262 is pushed and moved in the clockwise direction, and the holding member 272 is pushed and moved in the counterclockwise direction, so that the leg portions 262d, 272d of the holding members 262, 272 are respectively received in the recesses 252s1, 252s2 and the recesses 251s1, 251s1. However, when the upper rail 252 and the lower rail 251 are positioned relative to each other such that the recesses 252s1, 252s2 of the upper rail 252 are not aligned with the recesses 251s1, 251s2 of the lower rail 251, the holding members 262, 272 of the flip-up locking devices 260, 270 are inhibited from rotating in the releasing directions. Namely, when the recesses 252s1, 252s2 are not aligned with the recesses 251s1, 251s2, the leg portions 262d, 272d are not received in the recesses 251s 1, 251s2 of the lower rail 251 even if the holding members 262, 272 are pushed and moved in the clockwise direction and the counterclockwise direction, respectively. Rather, the leg portions 262d, 272d abut on the bottom of the right-hand L-shaped portion 251x2 so as to be inhibited from rotating. Accordingly, in this case, the flip-up locking devices 260, 270 cannot be unlocked even if the first cable 9 is pulled. In this embodiment, the position at which the recesses 252s1, 252s2 are aligned with the recesses 251s1, 251s2 functions as the "flip-up position" of the invention. At the flip-up position 100A, the flip-up locking device operating mechanism 280 operates to push and move the holding members 262, 272 of the flip-up locking devices 260, 270, thereby to operate the hooks 261, 271 to the released positions. Further, the flip-up locking device operating mechanism 280 and the second slide locking device operating mechanism 290 operate in conjunction with each other, to place the second slide mechanism 250 in the slide locked position. A series of these operations or arrangements functions as the "flip-up position detecting unit" of the invention.

Figure 6:
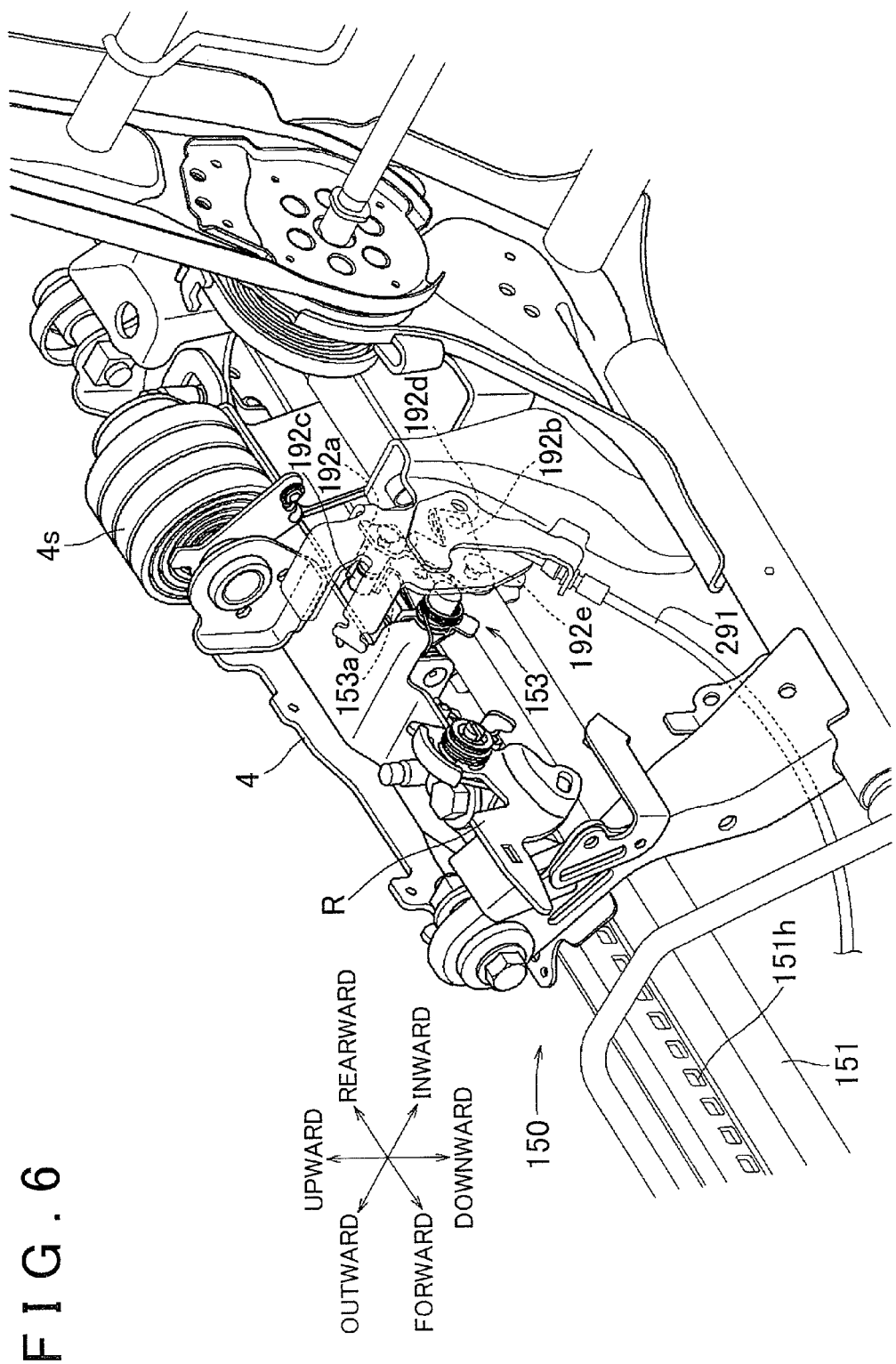
FIG. 6 is a partial perspective view showing a rotation hinge mechanism on the outer side of the vehicle seat according to the embodiment of FIG. 1.
Figure 7:
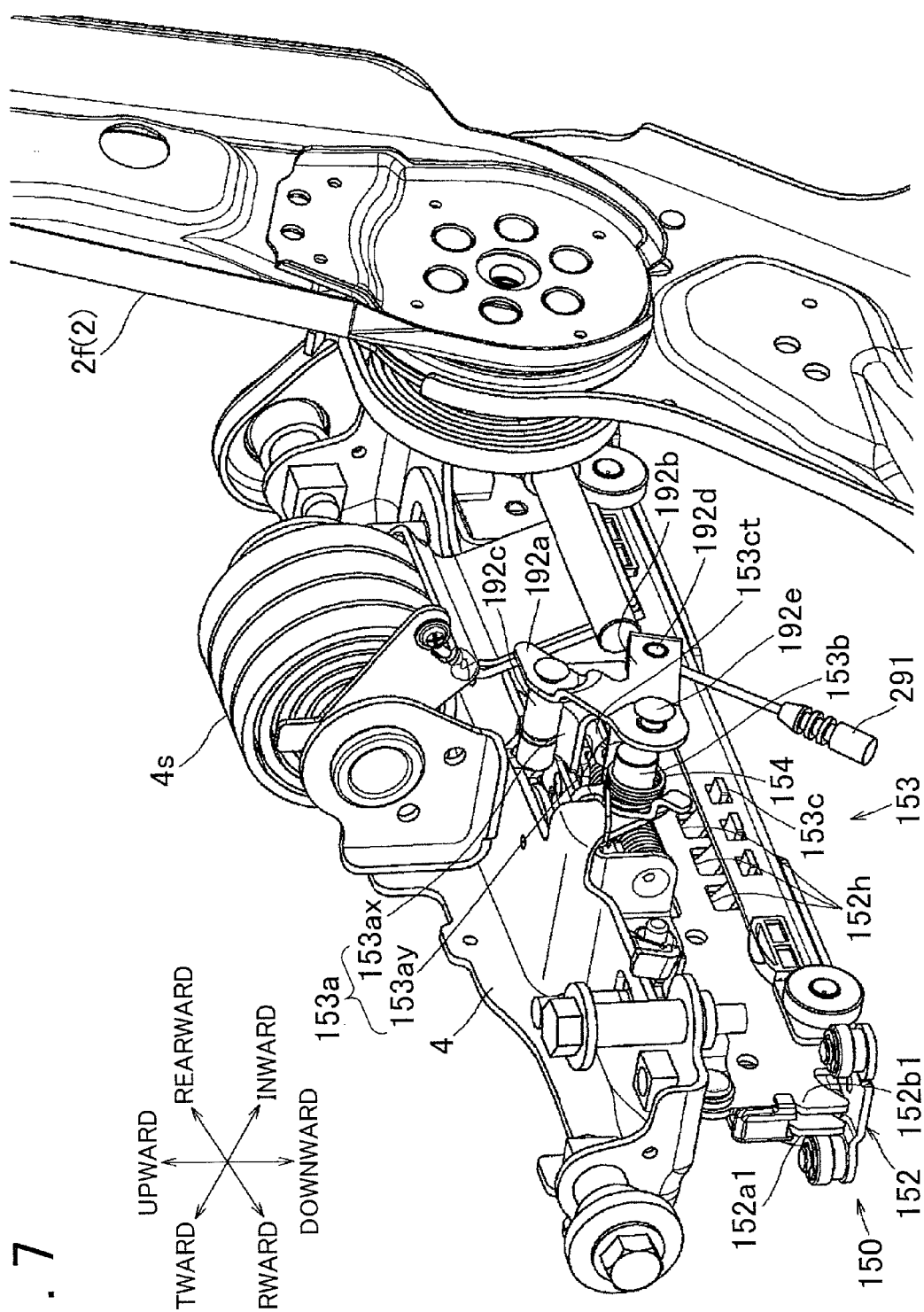
FIG. 7 is a partial perspective view showing in detail an upper rail of a first slide mechanism of the vehicle seat according to the embodiment of FIG. 1.

Next, the first slide mechanism 150 will be described with reference to FIGS. 6, 7, 19 and 20. The basic construction of the first slide mechanism 150 is similar to that of the second slide mechanism 250. Thus, the arrangements of the first slide mechanism 150 which are identical with or similar to those of the second slide mechanism 250 will not be described in detail. As shown in FIG. 6 and FIG. 7, the first slide mechanism 150 has the lower rail 151 and the upper rail 152. Like the lower rail 251, the lower rail 151 has a cross section that surround the shape of letter "U", and a plurality of through-holes 151h are formed in the thickness direction, at equal intervals over the entire length of the rail 151. The lower rail 151 has no recesses like the recesses 251s1, 251s2 provided in the second slide mechanism 250. The cross-sectional shape of the upper rail 152 has right-hand side portion 152a1 and left-hand side portion 152b1 that are shaped like flat plates, and hang straight downward such that their plate surfaces are opposed to each other. Thus, the upper rail 152 is arranged to be guided by the lower rail 151 to be slidable in the longitudinal direction. Also, three through-holes 152h are formed in a middle portion of the left-hand side portion 152b1 as viewed in the longitudinal direction, at equal intervals along the longitudinal direction, so as to extend through the thickness of the side portion 152b1. The upper rail 152 has no recesses like the recesses 252s1, 252s2 provided in the second slide mechanism 250.

The first slide locking device 153 is installed in the middle portion of the upper rail 152 in which the through-holes 152h are formed. The first slide locking device 153 has a locking member 153c having three claws that can be inserted through the through-holes 152h, respectively. The locking member 153c is rotatably supported on a pivot (not shown) to be connected to the upper rail 152. The locking member 153c is normally biased in a direction in which the claws of the member 153c are inserted into the respective through-holes 152h, under the bias force of a spring member (not shown). Accordingly, when the upper rail 152 is positioned relative to the lower rail 151 during sliding such that the through-holes 152h formed in the upper rail 152 are aligned with the through-holes 151h formed in the lower rail 151, the claws of the locking member 153c of the first slide locking device 153 are inserted through the through-holes 152h, 151h, under the above-mentioned bias force. As a result, the first slide mechanism 150 is held in the slide locked position in which the sliding movement of the upper rail 152 is inhibited.

Figure 19:
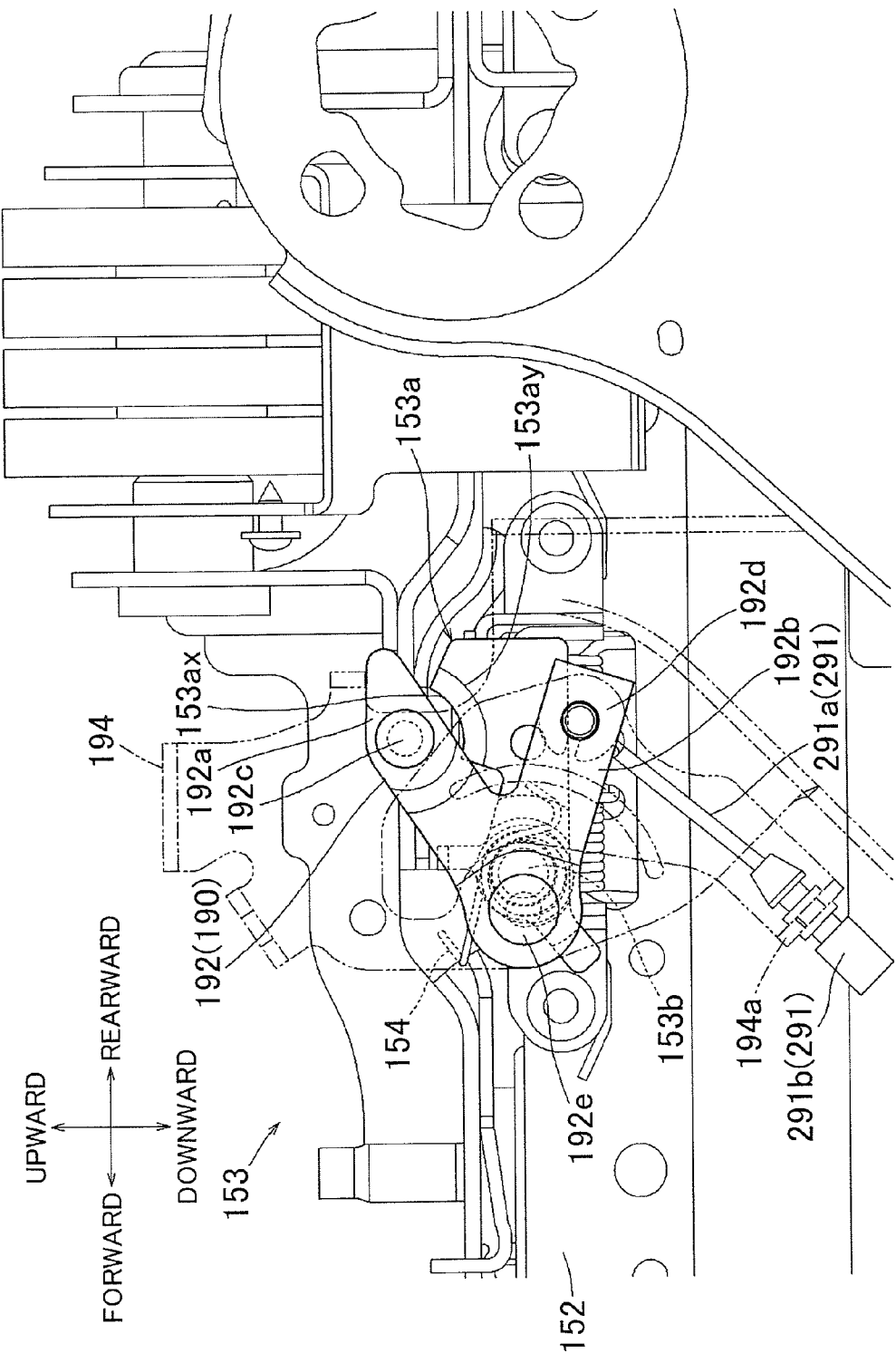
FIG. 19 is a view illustrating the initial position of a first slide locking device operating mechanism of the vehicle seat according to the embodiment of FIG. 1.
Figure 20:
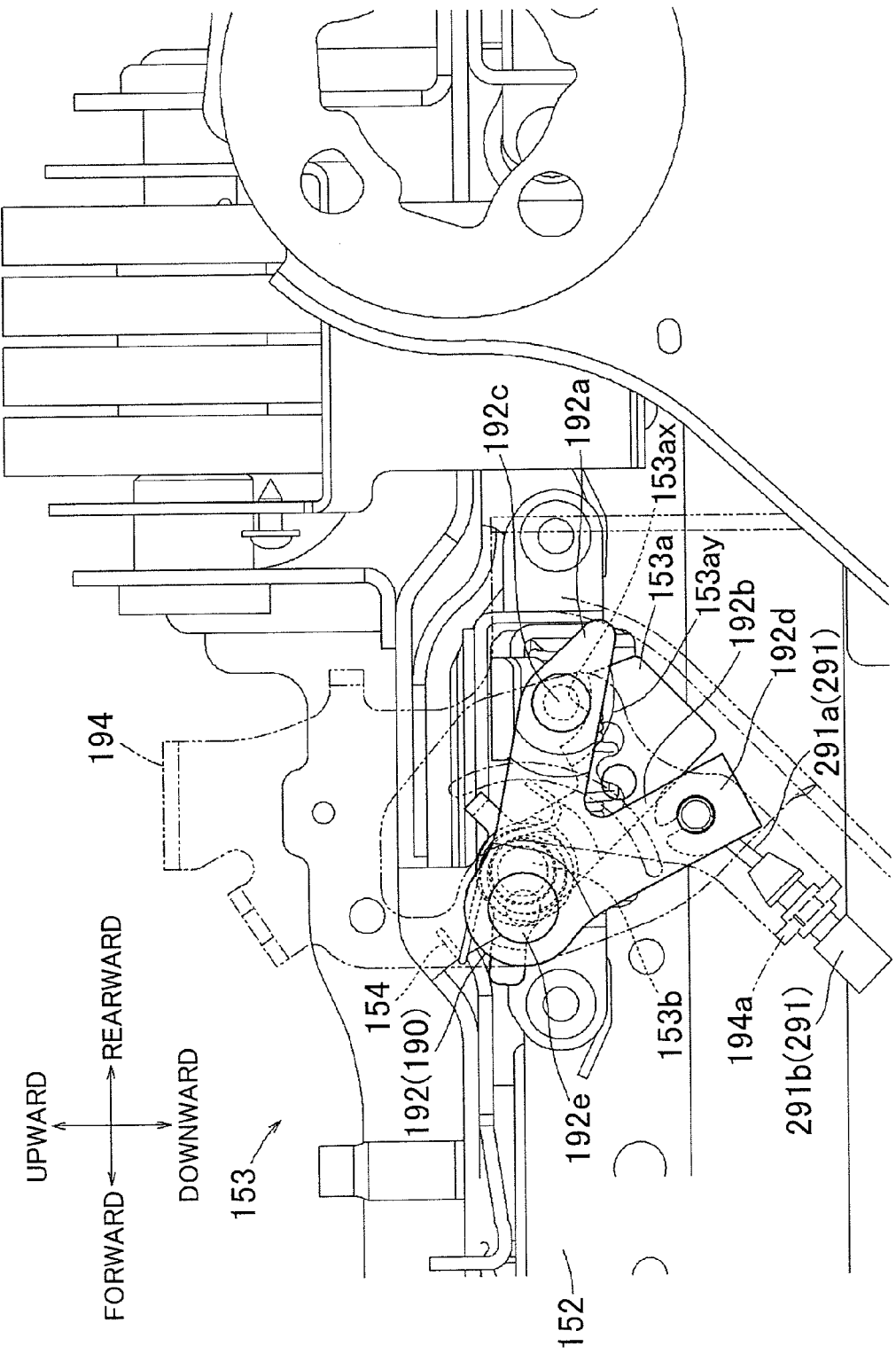
FIG. 20 is a view illustrating an operating condition where the first slide locking device operating mechanism of the vehicle seat according to the embodiment of FIG. 1 operates to place a first slide locking device in a slide unlocking position.

The first slide mechanism 150 is unlocked, i.e., released from the slide locked position when an operating arm 153a provided adjacent to the locking member 153c as shown in FIG. 7 is operated to rock. As shown in FIGS. 19 and 20, the operating arm 153 is rotatably supported on a pivot 153b to be connected to the upper rail 152. The operating arm 153a has a distal end portion that is partially bent outwardly of the vehicle in the thickness direction. The distal end portion of the operating arm 153a is formed at its lower face side with a pushing portion 153ay for pushing the locking member 153c. Also, the distal end portion of the operating arm 153a is formed at its upper face side with as a receiving portion 153ax that receives pushing force from a first L-shaped link 192 of the first slide locking device operating mechanism 190 (which will be described later). The operating arm 153a is normally biased under the bias force of a spring member 154, in a direction (counterclockwise direction in FIG. 19) opposite to the direction in which the locking member 153c is pushed by the operating arm 153a, so as to be held in a position spaced apart from the locking member 153c. In the meantime, the locking member 153c is integrally provided with a protruding plate 153ct (see FIG. 7) that is pushed by the pushing portion 153ay formed on the operating arm 153a. With this arrangement, when the operating arm 153a is operated to rock, the protruding plate 153ct is pushed down by the pushing portion 153ay, so that the locking member 153c is unlocked (i.e., the claws are disengaged from the upper rail 152), as shown in FIG. 20.

Next, the specific construction of the flip-up locking devices 260, 270 will be described with reference to FIGS. 8, 10, 15-18. While the flip-up locking devices 260, 270 are oriented in opposite longitudinal directions, they have the same basic construction. Accordingly, the specific construction of only the flip-up locking device 260 mounted on the front side of the vehicle, which is illustrated on the right-hand side in FIG. 8, will be described. The flip-up locking device 270 mounted on the rear side of the vehicle will not be specifically described, except for listing of its components and portions. The flip-up locking device 260 mounted on the front side of the vehicle is located on the left-hand side in FIGS. 15-18. The flip-up locking device 260 has the hook 261 formed from a steel plate, holding member 262, and a tension spring 263 mounted between and engaged with the hook 261 and the holding member 262. The hook 261 and the holding member 262 are interposed between the right-hand side portion 252a1 and left-hand side portion 252b1 of the upper rail 252. The hook 261 is rotatably supported on a pivot 261a to be connected to the upper rail 252, and the holding member 262 is also rotatably supported on a pivot 262a to be connected to the upper rail 252. The hook 261 and the holding member 262 are normally biased in such a direction as to be pulled toward each other, under the bias force of the tension spring 263 mounted between the hook 261 and the holding member 262. The tension spring 263 is engaged at one end thereof with a head portion 261c of the hook 261, and is engaged at the other end with a head portion 262c of the holding member 262.

The hook 261 is formed with an engaging convex portion 261b that protrudes from a part of its periphery. On the other hand, the holding member 262 is formed with an engaging concave portion 262b as a recess formed in a part of its periphery. The engaging convex portion 261b and the engaging concave portion 262b are pulled toward each other under the above-mentioned bias force, so as to be engaged with each other with their convex and concave profiles matching each other. Thus, the hook 261 and the holding member 262 are held in a locked position in which these members 261, 262 inhibit each other from rotating. The lock on the hook 261 and the holding member 262 is released when the head portion 262c of the holding member 262 is rotated away from the head portion 261c of the hook 261, and the engaging convex portion 261b and the engaging concave portion 262b are disengaged from each other, as shown in FIG. 17 and FIG. 18. As shown in these figures, the hook 261 has an opening arranged to receive the corresponding striker 5s, and a receiving portion 261d is formed on a lower wall of the opening of the hook 261. When the seat body 1 is tilted down toward the floor F, the striker 5s abuts on the receiving portion 261d, and pushes the receiving portion 261d downward. With the receiving portion 261d thus pushed downward, the striker 5s makes its way into the opening of the hook 261, and the hook 261 is pushed and rotated in the counterclockwise direction so that the engaging convex portion 261b is brought into engagement with the engaging concave portion 262b of the holding member 262, thereby to place the hook 261 and the holding member 262 in the locked position. As the hook 261 rotates in the counterclockwise direction, a pressing portion 261e formed on an upper wall of the opening comes around to be located behind the striker 5s. As a result, the striker 5s is engaged with the hook 261, and is held in a condition where the striker 5s is inhibited from being pulled out of the hook 261.

The other flip-up locking device 270 has substantially the same construction as the flip-up locking device 260 as described above. Namely, the flip-up locking device 270 includes the hook 271, holding member 272, and a tension spring 273. The hook 271 is pivotally supported on a pivot 271a, and has an engaging convex portion 271b, a head portion 271c, a receiving portion 271d, and a pressing portion 271e. The holding member 272 is pivotally supported on a pivot 272a, and has an engaging concave portion 272b, a head portion 272c, and a leg portion 272d.

Figure 10:
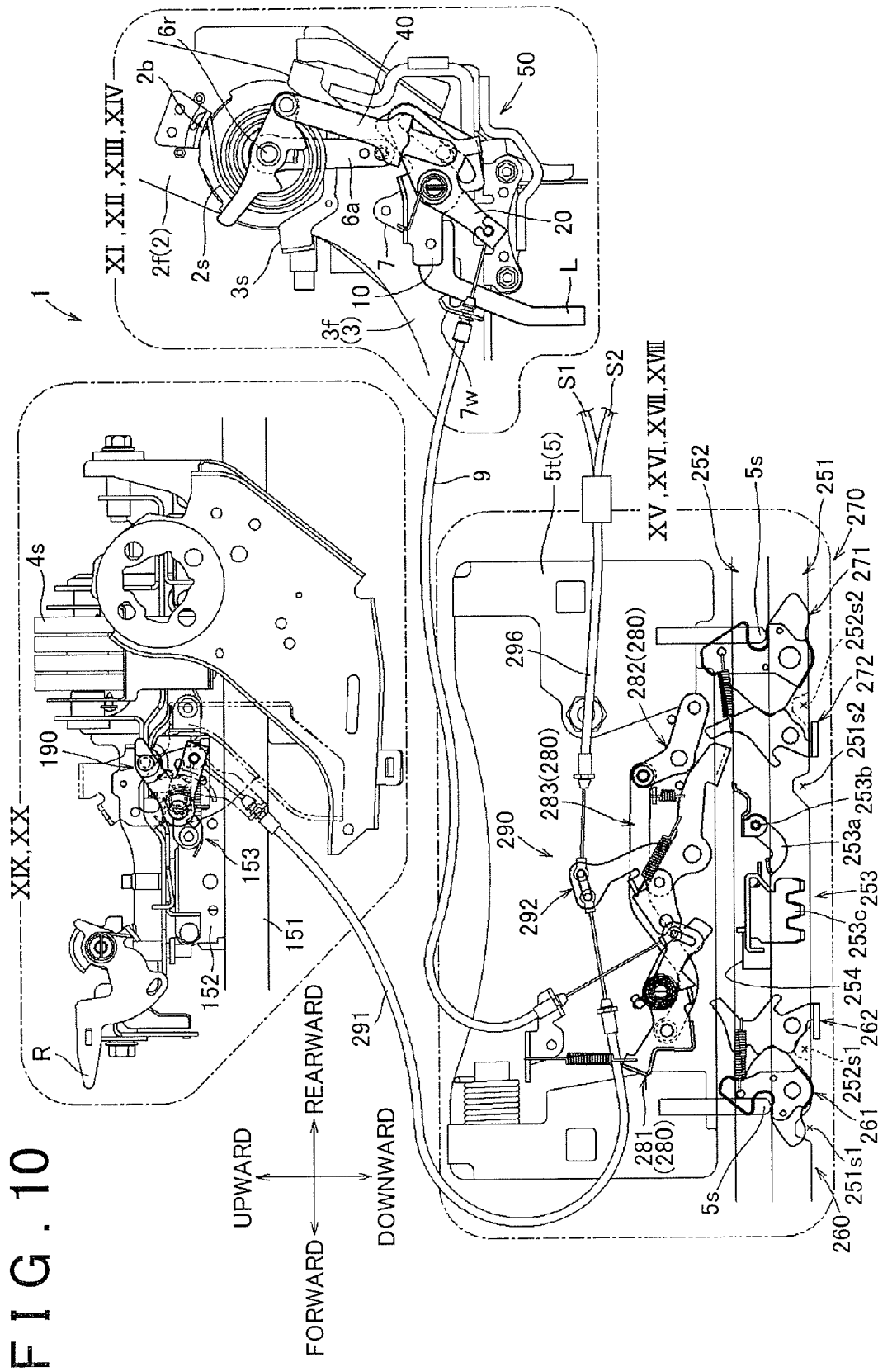
FIG. 10 is a view schematically showing the arrangement of cables routed among various mechanisms of the vehicle seat according to the embodiment of FIG. 1.
Figure 16:
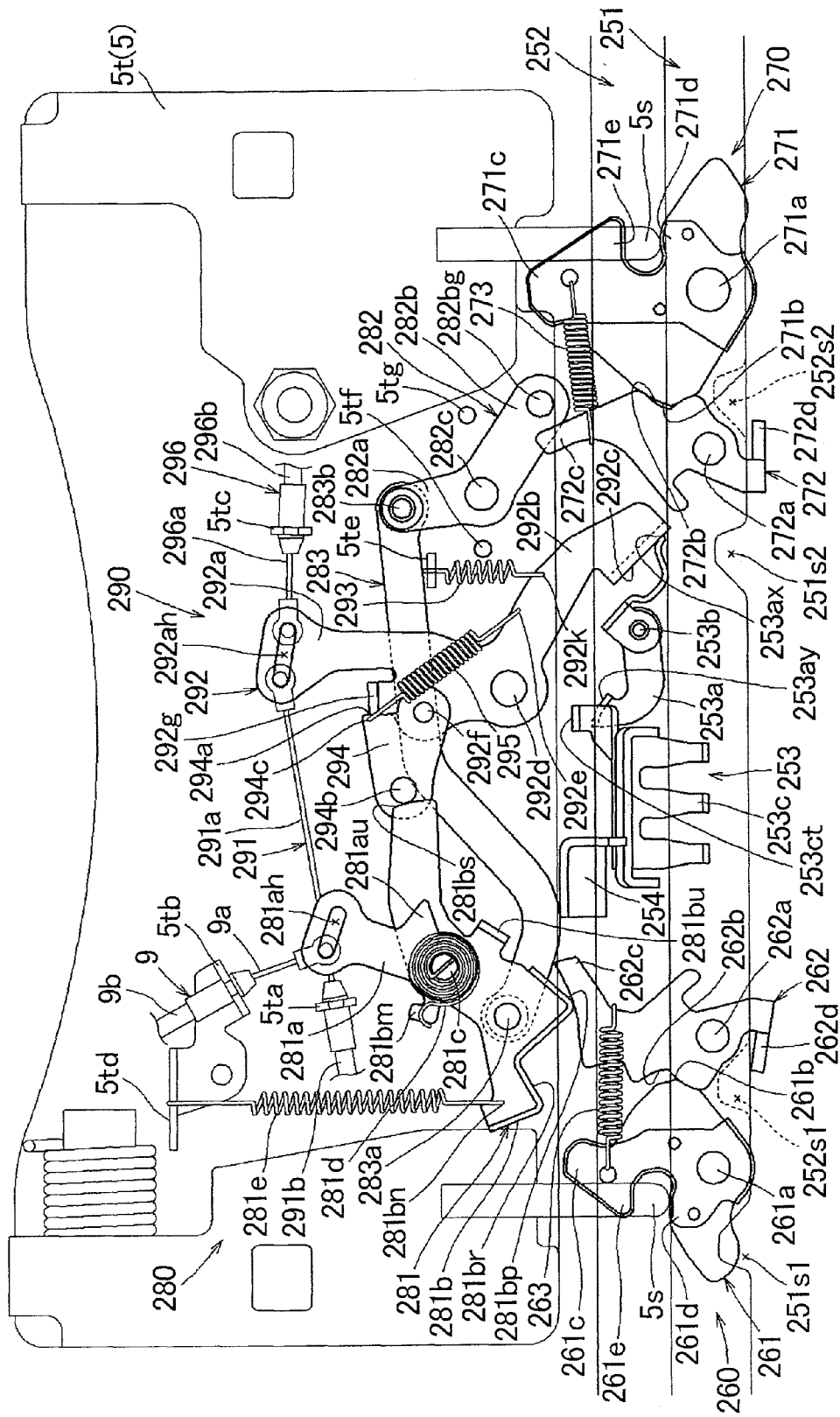
FIG. 16 is a view illustrating an operating condition where the second slide locking device of the vehicle seat according to the embodiment of FIG. 1 is released from a slide locking position.

Next, the construction of the flip-up locking device operating mechanism 280 as one of the operating mechanisms will be described with reference to FIG. 10 and FIGS. 15-18. FIG. 10 schematically illustrates the arrangement of cables routed among the operating lever mechanism 50 as shown in FIG. 2, first slide mechanism 150, second slide mechanism 250, flip-up locking device operating mechanism 280, first slide locking device operating mechanism 190, second slide locking device operating mechanism 290, and so forth, but the construction of the seat body 1 is not illustrated. The flip-up locking device operating mechanism 280 is operable to unlock the flip-up locking devices 260, 270. Namely, the flip-up locking device operating mechanism 280 is mounted on the support plate 5t of the above-mentioned support mechanism 5, and has a first rotary member 281, a second rotary member 282, and a connecting link 283 that connects the first and second rotary members 281, 282, as shown in FIG. 10 and FIG. 15. When the first cable 9 is pulled, the first rotary member 281 and the second rotary member 282 are rotated in conjunction with each other by means of the connecting link 283. Then, the holding members 262, 272 of the flip-up locking devices 260, 270 provided in the second slide mechanism 250 are kicked and moved by the first rotary member 281 and the second rotary member 282, respectively. As a result, the flip-up locking devices 260, 270 are simultaneously unlocked. The unlocking operation on the flip-up locking devices 260, 270 caused by pulling of the first cable 9 can be carried out when the recesses 252s1, 252s2 formed in the upper rail 252 of the second slide mechanism 250 are aligned with the recesses 251s1, 251s2 formed in the lower rail 251 (when the second slide mechanism 250 is placed in the flip-up position 100A), as shown in FIG. 17 and FIG. 18. However, if sliding of the upper rail 252 changes the positional relationship between the recesses 252s1, 252s2 and the recesses 251s1, 251s2, and the recesses 252s1, 252s2 are not aligned with the recesses 252s1, 251s2, as shown in FIGS. 15, 16, the unlocking operation cannot be performed on the flip-up locking devices 260, 270 even if the first cable 9 is pulled. The first rotary member 281 of the flip-up locking device operating mechanism 280 consists of a first operating portion 281a and a first pushing portion 281b, which are formed separately from each other, and the first operating portion 281a and the first pushing portion 281b are rotatably supported on the support plate 5t of the support mechanism 5 via a pivot 281c. The pivot 281c is joined integrally to the first operating portion 281a, and is connected to the first pushing portion 281b so as to rotatably support this portion 281b. With this arrangement, the first pushing portion 281b is freely rotatable in the clockwise direction or the counterclockwise direction, which is the same as the direction of rotation of the first operating portion 281a. The first operating portion 281a is formed with a stopper 281au for inhibiting the first operating portion 28 from rotating in the clockwise direction relative to the first pushing portion 281b in the midst of its rotation. The stopper 281au is formed in a triangular shape to protrude from a part of the first operating member 281a in a direction perpendicular to the longitudinal direction thereof. On the other hand, a stopper 281bu is formed by bending a part of the first pushing portion 281b in the thickness direction thereof, at a position where the stopper 281bu can engage with the stopper 281au of the first operating portion 281a. Thus, the rotation of the first operating portion 281a is restricted by the stoppers 281au, 281bu abutting on each other. The first operating portion 281a also has a long hole 281ah formed through the thickness thereof. An end portion of the inner member 9a of the first cable 9 is engaged with the long hole 281ah. In this connection, an end portion of the outer member 9b of the first cable 9 is engaged with a cable-hanging portion 5tb formed integrally on the support plate 5t. With this arrangement, the first operating portion 281a is rotated in the counterclockwise direction as the inner member 9a is pulled upward.

A coil spring 281d is provided between the first operating portion 281a and the first pushing portion 281b, for urging the first operating portion 281a to rotate in the clockwise direction relative to the first pushing portion 281*b*. One end of the coil spring 281*d* is fitted in and engaged with a head portion of the pivot 281*c* integral with the first operating portion 281*a*, and the other end is engaged with and attached to a spring-engaging portion 281*bm* formed on the first pushing portion 281*b*. With this arrangement, the first operating portion 281*a*, which is urged to rotate in the clockwise direction relative to the first pushing portion 281*b*, is held in a rotational position in which the stopper 281*au* abuts on the stopper 281*bu*. In this condition, the first operating portion 281*a* and the first pushing portion 281*b* can rotate as a unit or integrally with each other, under the bias force of the coil spring 281*d*. The first pushing portion 281*b* is formed like a band plate, and is supported at a generally middle portion on the pivot 281*c*. A spring-engaging portion 281*bn* is formed in an end portion (on the vehicle front side) of the first pushing portion 281*b*. A tension spring 281*e* is engaged at one end thereof with the spring-engaging portion 281*bn*, and is engaged at the other end with a spring-engaging portion 5*td* formed integrally on the support plate 5*t*. With the tension spring 281*e* thus provided, the first pushing portion 281*b* is urged to rotate in the clockwise direction. Also, the first pushing portion 281*b* has a first engaging piece 281*bp* and a second engaging piece 281*br*, which are formed in an end portion on the vehicle front side, by bending parts of the first pushing portion 281*b* in the thickness direction. When the first cable 9 is pulled up and the first pushing portion 281*b* is rotated in the counterclockwise direction along with the first operating portion 281*a*, as shown in FIGS. 16-18, the first engaging piece 281*bp* and the second engaging piece 281*br* function to kick and move the head portion 262*c* of the holding member 262 of the flip-up locking device 260, so as to rotate the holding member 262. In this connection, the spring force of the coil spring 281*d* provided between the first operating portion 281*a* and the first pushing portion 281*b* is set to be stronger than the spring force of the tension spring 263 provided between the hook 261 and holding member 262 of the flip-up locking device 260, and the spring force of the tension spring 281*e* engaged with the first pushing portion 281*b*. Accordingly, the first operating portion 281*a* and the first pushing portion 281*b* are able to rotate the holding member 262 in the clockwise direction while they are kept in an integrally rotatable condition. The first pushing portion 281*b* is formed at an end portion on the vehicle rear side with a pressing portion 281*bs* that extends from the end portion. The pressing portion 281*bs* is adapted to be engaged with an engaging pin 292*b* provided on the second L-shaped link 292 located rearwardly of the first pushing portion 281*b* as viewed in the longitudinal direction of the vehicle. The pressing portion 281*bs* functions to engage with the engaging pin 294*b* of the second L-shaped link 292, so as to kick and move the second L-shaped link 292 for rotation thereof. More specifically, when the first cable 9 is pulled, and the first pushing portion 281*b* is rotated along with the first operating portion 281*a* in the counterclockwise direction, as shown in FIG. 16, the pressing portion 281 bs engages with the engaging pin 294*b* of the second L-shaped link 292. In this connection, the spring force of the coil spring 281*d* provided between the first operating portion 281*a* and the first pushing portion 281*b* is set to be stronger than that of a tension spring 293 of the second L-shaped link 292 which will be described later. Accordingly, when the first pushing portion 281*b* is rotated along with the first operating portion 281*a* as described above, the second L-shaped link 292 can be rotated in the clockwise direction.

Unlike the first rotary member 281, the second rotary member 292 has a second operating portion 282*a* and a second pushing portion 282*b*, which are formed integrally into a generally L-shape, as shown in FIG. 15. The second rotary member 282 is rotatably supported on a pivot 282*c* to be connected to the support plate 5*t*. A stopper 5*tg* formed integrally with the support plate 5*t* is provided on the upper side (in FIG. 15) of the second pushing portion 282*b*. With the stopper 5*tg* thus provided, rotation of the second rotary member 282 in the counterclockwise direction is restricted. The second pushing portion 282*b* is placed in the initial position when this portion 282*b* abuts on the stopper 5*tg*. An engaging pin 292*bg* is mounted on an end portion of the second pushing portion 282*b*. When the first cable 9 is pulled, and the second pushing portion 282*b* is rotated as a unit with the second operating portion 282*a* in the clockwise direction, the engaging pin 282*bg* functions to kick and move a head portion 272*c* of the holding member 272 of the flip-up locking device 270, so as to rotate the head portion 272*c*.

The connecting link 283 is provided between the second operating portion 282*a* and the first pushing portion 281*b* for connecting these portions 282*a*, 281*b*. More specifically, a left-side end portion of the connecting link 283 is rotatably supported on a pivot 283*a* to be connected to the first pushing portion 281*b*, and its right-side end portion is rotatably supported on a pivot 283*b* to be connected to the second operating portion 282*a*. When the first cable 9 is pulled and the first operating portion 281*a* is rotated, the connecting link 283 operates to pull the pivot 283*a* as a joint with the first pushing portion 281*b* in a slanting, downward direction, and transmit the movement of the first pushing portion 281*b* to the second operating portion 282*a* as a movement to pull up the pivot 283*b* as a joint with the second operating portion 282*a* in a slanting upward direction, as shown in FIGS. 16-18. Then, the second rotary member 282 is rotated about the pivot 282*c* in the clockwise direction. In this manner, the operating force of the first cable 9 is efficiently transmitted from the first operating portion 281*a* to the second operating portion 282*a*.

Next, the construction of the second slide locking device operating mechanism 290 as one of the operating mechanisms will be described with reference to FIGS. 15-18. The second slide locking device operating mechanism 290 is operable to release the second slide locking device 253 from the slide locking position. As shown in FIG. 15, the second slide locking device operating mechanism 290 includes the second L-shaped link 292, tension spring 293, oscillating bracket 294, tension spring 295, second cable 291, and a third cable 296. The second L-shaped link 292 has a first arm portion 292*a* and a second arm portion 292*b*, which are formed integrally into a generally L-shape. The second L-shaped link 292 is rotatably supported on the support plate 5*t*, via a pivot 292*d* located at a joint between the first arm portion 292*a* and the second arm portion 292*b*. The second L-shaped link 292 has a long hole 292*ah* formed in the thickness direction through a distal end portion of the first arm portion 292*a* that extends upward in FIG. 15. An end portion of an inner member 291*a* of the second cable 291 and an end portion of an inner member 296*a* of the third cable 296 are engaged in the long hole 292*ah*. Also, the second L-shaped link 292 has a pushing portion 292*c* formed at a distal end portion of the second arm portion 292*b* that extends to the right in FIG. 15. The pushing portion 292*c* is adapted to push the receiving portion 253*ax* of the operating arm 253*a* of the second slide locking device 253 as described above. The tension spring 293 of the second L-shaped link 292 is hung or engaged between a spring-engaging portion 292*k* formed in a middle portion of the second arm portion 292*b*, and an engaging portion 5*te* formed on the support plate 5*t*. A stopper 5*tf* formed integrally with the support plate 5*t* is provided on the upper side (in FIG. 15) of the second aim portion 292*b*. With the stopper 5*tf* thus provided, rotation of the second L-shaped link 292 in the counterclockwise direction is restricted. The second arm portion 292*b* is placed in the initial position when it abuts on the stopper 5*tf*. With this arrangement, the second L-shaped link 292 is normally urged to rotate in the counterclockwise direction, and is held in the initial position in which rotation of the link 292 is restricted or inhibited by the stopper 5*tf*, before the second cable 291 and the third cable 296 are pulled.

The above-mentioned oscillating bracket 294 is provided between the long hole 292*ah* of the first aim portion 292*a* of the second L-shaped link 292, and the pivot 292*d*. The oscillating bracket 294 functions to rotate the second L-shaped link 292, by engaging with the first rotary member 281 of the flip-up locking device operating mechanism 280, as shown in FIG. 16. The oscillating bracket 294 is formed like a band plate. One end of the oscillating bracket 294 is rotatably supported on a pivot 292*f* formed on a middle portion of the first aim portion 292*a*. Also, the engaging pin 294*b* that protrudes in the thickness direction is provided at the other end (distal end) of the oscillating bracket 294. The engaging pin 294*b* is adapted to be pressed by the pressing portion 281*bs* of the first pushing portion 281*b* of the first rotary member 281 of the flip-up locking device operating mechanism 280. The oscillating bracket 294 is formed with a stopper 294*a* that inhibits the bracket 294 from rotating, in midstream, in the clockwise direction relative to the first arm portion 292*a* of the second L-shaped link 292. The stopper 294*a* is formed in a triangular shape by projecting a part of the oscillating bracket 294 in a direction perpendicular to the longitudinal direction of the bracket 294. On the other hand, the first arm portion 292*a* has a stopper 292*g* formed by bending a part of the arm portion 292*a* in the thickness direction, at a position where the first arm portion 292*a* engages with the stopper 294*a* of the oscillating bracket 294. Thus, the oscillating bracket 294 is inhibited from rotating in the clockwise direction when these stoppers 294*a*, 292*g* abut on each other. With the rotation thus inhibited, the second L-shaped link 292 is rotated in the clockwise direction via the engaging pin 294 when it is pressed by the pressing portion 281*bs* of the first pushing portion 281*b*. More specifically, when the first cable 9 is pulled, the first pushing portion 281*b* (of the flip-up locking device operating mechanism 280) is rotated in the counterclockwise direction, so that the pressing portion 281*bs* presses the engaging pin 284*b* from below the pin 284*b*. Then, the second L-shaped link 292 is rotated in the clockwise direction via the oscillating bracket 294. Then, the pushing portion 292*c* of the second arm portion 292*b* of the second L-shaped link 292 pushes the receiving portion 253*ax* of the operating arm 253*a* of the second slide locking device 253, thereby to release the second slide locking device 253 from the slide locking position.

The rotation locus of the pressing portion 281*bs* of the first pushing portion 281*b* (the flip-up locking device operating mechanism 280) lies on an arc having a center at the pivot 281*c* of the first pushing portion 281*b*. The rotation locus of the engaging pin 294*b* of the oscillating bracket 294 lies on an arc having a center at the pivot 292*d* of the second L-shaped link 292. Also, the pivot 281*c* of the first pushing portion 281*b* is spaced apart from the pivot 292*d* of the second L-shaped link 292 in the longitudinal direction of the vehicle. Therefore, the engaging pin 294*b* is pressed by the pressing portion 281*bs* while the first pushing portion 281*b* is within a given range of rotation. Once the first pushing portion 281*b* goes beyond the rotation range, it throws off the engaging pin 294*b*, and further rotates in the counterclockwise direction, so that the engaging pin 294*b* and the pressing portion 281*bs* are separated from each other. As a result, the engaging pin 294*b* ceases to be pressed by the pressing portion 281*bs*. Then, under the bias force of the tension spring 293 of the second L-shaped link 292, the second slide locking device 253 is brought back into the slide locking position. On the other hand, if the first cable 9 is released, and the first pushing portion 281*b* (of the flip-up locking device operating mechanism 280) is rotated in the clockwise direction under the bias force of the tension spring 281*e*, the first pushing portion 281*b* abuts on the upper face of the engaging pin 294*b*. In this connection, the rotation of the oscillating bracket 294 is restricted only in the clockwise direction. Therefore, the oscillating bracket 294, when pressed by the first pushing portion 281*b*, is rotated in the counterclockwise direction so that the engaging pin 294*b* is retracted. As a result, the first pushing portion 281*b* returns to the initial position (the position of FIG. 15). A tension spring 295 is hung or engaged between a spring-engaging portion 294*c* formed in a middle portion of the oscillating bracket 294, and a spring-engaging portion 292*e* formed in a middle portion of the second arm portion 292*b* of the second L-shaped link 292, and the oscillating bracket 294 is normally urged to rotate in the clockwise direction by means of the tension spring 295. Therefore, after the first pushing portion 281*b* returns to the initial position (the position of FIG. 15), the oscillating bracket 294 also returns to the initial position.

The second cable 291 has a double structure having a wire-like inner member 291*a*, and a tubular outer member 291*b* through which the inner member 291*a* is inserted. One end portion of the inner member 291*a*, which is illustrated in FIG. 15, is engaged with the long hole 292*ah* of the second L-shaped link 292, and one end portion of the outer member 291*b* is engaged with a cable-engaging portion 5*ta* formed integrally on the support plate 5*t* of the support mechanism 5. The second cable 291 is connected at the other end with the first L-shaped link 192. When the second L-shaped link 292 rotates when it is operated by the first rotary member 281 of the flip-up locking device operating mechanism 280, the second slide locking device 253 is released from the slide locking position. At the same time, the second cable 291 is pulled, and the operating force is transmitted to the first L-shaped link 192, so that the first L-shaped link 192 rotates, so as to release the first slide locking device 153 from the slide locking position.

The third cable 296 has a double structure having a wire-like inner member 296*a*, and a tubular outer member 296*b* through which the inner member 296*a* is inserted. One end portion of the inner member 296*a*, which is illustrated in FIG. 15, is engaged with the long hole 292*ah* of the second L-shaped link 292, and one end portion of the outer member 296*b* is engaged with a cable-engaging portion 5*tc* formed integrally on the support plate 5*t* of the support mechanism 5. The third cable 296 is connected at the other end with the slide levers S1, S2. When the third cable 296 is pulled from the slide lever S1, S2, the second L-shaped link 292 is rotated solely or independently, so that the second slide locking device 253 is released from the slide locking position. At the same time, the second cable 291 is pulled, and the operating force is transmitted to the first L-shaped link 192, so that the first L-shaped link 192 rotates, so as to release the first slide locking device 153 from the slide locking position.

Next, the construction of the first slide locking device operating mechanism 190 as one of the operating mechanisms will be described with reference to FIGS. 19, 20. The first slide locking device operating mechanism 190 is operable to release the first slide locking device 153 from the slide locking position. As shown in FIGS. 19, 20, the first slide locking device operating mechanism 190 includes the first L-shaped link 192 and a base plate 194. The base plate 194 is arranged to support the first L-shaped link 192, and is fixed to the seat cushion frame 3f. The base plate 194 is formed at its lower end with a cable-engaging portion 194b with which an end portion of the outer member 291b of the second cable 291 is engaged. The first L-shaped link 192 has a first arm portion 192a and a second arm portion 192b, which are formed integrally into a generally L-shape, as shown in FIG. 19. The first L-shaped link 192 is rotatably supported on the base plate 194 via a pivot 192e. An engaging pin 192c that protrudes in the thickness direction is provided on a distal end portion of the first arm portion 192a that extends upward in FIG. 19. The engaging pin 192c is adapted to push the receiving portion 153ax of the operating arm 153a of the first slide locking device 153. Also, a cable-engaging portion 192d with which an end portion of the inner member 291a of the second cable 291 is engaged is formed on an end portion of the second arm portion 192b that extends to the right in FIG. 19. The second cable 291 is routed from the second L-shaped link 292 of the second slide locking device operating mechanism 290. The end portion of the inner member 291a, which is illustrated in FIG. 19, is engaged with the cable-engaging portion 192d of the second arm portion 192b of the first L-shaped link 192, and the end portion of the outer member 291b is engaged with the cable-engaging portion 194a of the base plate 194 as described above. The bias force of the tension spring 293 for biasing the second L-shaped link 292 of the second slide locking device operating mechanism 290 is normally applied to the first L-shaped link 192. Therefore, the first L-shaped link 192 is normally biased in the counterclockwise direction, and held in the initial position as shown in FIG. 19. Thus, the engaging pin 192c is held in a position in which the pin 192c does not abut on the receiving portion 153ax of the operating arm 153a. On the other hand, if the second cable 291 is pulled according to the operation of the second slide locking device operating mechanism 290, the force with which the second cable 291 is pulled is transmitted to the first L-shaped link 192, and the first L-shaped link 192 is rotated in the clockwise direction, so that the engaging pin 192c pushes the receiving portion 153ax of the operating arm 153 of the first slide locking device 153, so as to release the first slide locking device 153 from the slide locking position.

Next, a method of use of the vehicle seat according to this embodiment will be described. As shown in FIG. 1, when the seat body 1 is in normal use for seating, the seat cushion 3 of the seat body 1 is held in a condition in which the strikers 5s of the support mechanism 5 are engaged with the hooks 261, 271 of the flip-up locking devices 260, 270 and prevented from being pulled out of the hooks 261, 271. The seat back 2 is in the standing position 1A in which the seat back 2 stands up relative to the seat cushion 3.

In order to raise the seat body 1 away from the floor F and place it in the storage position 1C in which the seat body 1 stands up to be located adjacent to the vehicle wall B, the operating lever L of the lever operating mechanism 50 provided on the seat body 1 is pulled rearward. More specifically, the operating lever L is moved from the initial position shown in FIG. 11, to the position shown in FIG. 12. As a result, the switching arm 6a is rotated in the clockwise direction, and the reclining devices 6, 6 are unlocked, so that the reclining angle of the seat back 2 ceases to be fixed, and the seat back 2 is placed in the forward-tilted position 1B.

As shown in FIG. 13, the engaging portion 32 of the rotary bracket 30 engages with the spring-hanging bracket 2b of the seat back 2, whereby the forward-tilted position 1B of the seat back 2 is detected. Then, the transmission link 40 moves upward, so that the second bracket 20 rotates in the counterclockwise direction. As a result, the first cable 9 is pulled.

If the first cable 9 is pulled, the first operating portion 281a of the flip-up locking device operating mechanism 280 provided on the support plate 5t of the support mechanism 5 rotates from the initial position shown in FIG. 15 to the position shown in FIG. 16. Then, the first pushing portion 281b is rotated in the counterclockwise direction, along with the first operating portion 281a, under the bias force of the coil spring 281d disposed between the first operating portion 281a and the first pushing portion 281b. Then, the pressing portion 281bs of the first pushing portion 281b engages with the engaging pin 294b of the second L-shaped link 292, so that the second L-shaped link 292 rotates from the initial position shown in FIG. 15 to the position shown in FIG. 16. Then, the pushing portion 292c of the second arm portion 292b of the second L-shaped link 292 pushes the receiving portion 253ax of the operating arm 253a of the second slide locking device 253, so as to release the second slide locking device 253 from the slide locking position. At the same time, the first slide locking device 153 is released from the slide locking position. Also, the first engaging piece 281bp of the first pushing portion 281b kicks and moves the head portion 262c of the holding member 262 of the flip-up locking device 260 so as to rotate the holding member 262. However, when the upper rail 252 that slides along the lower rail 251 is positioned relative to the lower rail 251 such that the recesses 252s1, 252s2 of the upper rail 252 are not in alignment with the recesses 251s1, 251s2 of the lower rail 251, the leg portions 262d, 272d of the holding members 262, 272 of the flip-up locking devices 260, 270 are not received in the recesses 251s1, 251s2 of the lower rail 251, but abut on the bottom of the right-hand L-shaped portion 251x2, so that the holding members 262, 272 are inhibited from rotating in the releasing directions. Therefore, the seat body 1 is placed in a slidable condition while the flip-up locking devices 260, 270 are kept in the locking positions.

Then, the seat body 1 is caused to slide to the flip-up position 100A (see FIG. 1). Namely, the seat body 1 is moved to the flip-up position 100A at which the recesses 252s1, 252s2 formed in the upper rail 252 of the second slide mechanism 250 are aligned with the recesses 251s1, 251s2 formed in the lower rail 251. If the seat body 1 reaches the flip-up position 100A, the leg portions 262d, 272d can be received in the recesses 252s1, 252s2 of the lower rail 251, and the holding members 262, 272 rotate in the releasing directions. As a result, the first pushing portion 281b further rotates in the counterclockwise direction.

Then, the first pushing portion 281b throws off the engaging pin 294b, and further rotates in the counterclockwise direction, so that the engaging pin 294b and the pressing portion 281bs are separated from each other. As a result, the engaging pin 294b ceases to be pressed by the pressing portion 281bs. Then, under the bias force of the tension spring 293 of the second L-shaped link 292, the second slide locking device 253 is brought back into the slide locking position. At the same time, the first slide locking device 153 is brought into the slide locking position. At this time, the second engaging piece 281br of the first pushing portion 281b kicks and moves the head portion 262c of the holding member 262 of the flip-up locking device 260. Also, the engaging pin 282bg provided on the second pushing portion 282b of the second rotary member 282 that operates in conjunction with the first pushing portion 281b via the connecting link 283 kicks and moves the head portion 272c of the holding member 272 of the flip-up locking device 270. As a result, the flip-up locking devices 260, 270 are simultaneously unlocked, i.e., released from the locking positions. Namely, the flip-up position detecting unit operates.

The restricting bracket 254 is provided between the holding member 262 and the locking member 253c. The restricting bracket 254 makes its way into the rotation locus of the head portion 262c of the holding member 252, so as to restrict (inhibit) rotation of the holding member 262, until the second slide locking device 253 is completely placed in the slide locking position in which the claws of the locking member 253c of the second slide locking device 253 are inserted through the through-holes 252h, 251h. Thus, the restricting mechanism is provided for restricting (inhibiting) the operation to release the flip-up locking devices 260, 270 (coupling/decoupling switching mechanism) from the locking positions (so that the seat body 1 can be decoupled from the second slide mechanism 250), until the first slide locking device 153 and the second slide locking device 253 (slide locking mechanism) are completely placed in the slide locking positions.

While the flip-up locking devices 260, 270 are in the positions that permit the seat body 1 to be decoupled from the second slide mechanism 250, the seat body 1 is flipped up by means of the coil spring 4s (biasing means) of the rotation hinge mechanism 4. Also, when the seat body 1 is raised up away from the floor F, the support plate 5t is pulled by a pulling member (not shown), such as a wire, routed from the vehicle body, in conjunction with the movement of the seat body 1, and the support plate 5t is folded into the bottom 3b of the seat cushion 3 and stored in the storage recessed portion 3d. Thus, the seat body 1 is placed in the storage position 1C in which it is stored in the vehicle wall B.

Thus, the vehicle seat of this embodiment includes the flip-up position detecting unit that detects the predetermined flip-up position 100A of the seat body 1 within the slidable range over which the seat body 1 can slide by means of the slide mechanism 100. Thus, the seat body 1 can be positioned at the flip-up position 100A without requiring visual checking, and it can be easily determined by the flip-up position detecting unit that the seat body 1 is in the flip-up position 100A. Also, the flip-up locking devices 260, 270 (coupling/decoupling switching mechanism) are switched from the locking positions to the releasing (decoupling) positions, based on the detection of the flip-up position 100A by the flip-up position detecting unit, thus assuring improved operating ease and efficiency.

Also, the operating mechanism of this embodiment is arranged to operate both the flip-up locking devices 260, 270 (coupling/decoupling switching mechanism), and the first slide locking device 153 and second slide locking device 253 (slide locking mechanism), in conjunction with each other. The operating mechanism consists of the flip-up locking device operating mechanism 280, first slide locking device operating device 190, and the second slide locking device operating mechanism 290. If the flip-up position detecting unit detects the flip-up position 100A of the seat body 1, the flip-up locking devices 260, 270 (coupling/decoupling switching mechanism) are released from the locking positions to allow the seat body 1 to be decoupled from the second slide mechanism 250. At the same time, the first slide locking device 153 and second slide locking device 253 (slide locking mechanism) are placed in the slide locking positions. Thus, the seat body 1 is automatically flipped up when it reaches the flip-up position 100A. The above-indicated operating mechanisms 280, 190, 290 operate the flip-up locking devices 260, 270 (coupling/decoupling switching mechanism) and the first slide locking device 153 and second slide locking device 253 (slide locking mechanism) in conjunction with each other, so that the seat body 1 located at the flip-up position 100A can be automatically flipped up. With this arrangement, the slide mechanism 100 and the mechanism for flipping up the seat body 1 and storing it in place need not be operated through two or more manipulations by the user, thus assuring further improved operating ease and efficiency.

The vehicle seat of this embodiment also includes the operating lever mechanism 50 (forward-tilted position detecting unit) that detects that the seat body 1 is in the forward-tilted position 1B. The operating lever mechanism 50 (forward-tilted position detecting unit) initiates operations of the operating mechanisms 280, 190, 290, based on the detection of the seat back 2 placed in the forward-tilted position 1B. Thus, through a single operation to tilt the seat back 2 forward, a series of actions or operations, including flipping-up of the seat body 1 toward the inner wall of the vehicle compartment and storing of the seat body 1 in place, are automatically performed, thus assuring further improved operating ease and efficiency.

Also, the restricting mechanism is provided between the first slide locking device 153 and second slide locking device 253 (slide locking mechanism), and the flip-up locking devices 260, 270 (coupling/decoupling switching mechanism). The restricting mechanism functions to restrict or inhibit the operation to release the flip-up locking devices 260, 270 (coupling/decoupling switching mechanism) from the locking positions (to allow the seat body 1 to be decoupled from the second slide mechanism 250), until the first slide locking device 153 and second slide locking device 253 (slide locking mechanism) are completely placed in the slide locking positions. If the flip-up locking devices 260, 270 (coupling/decoupling switching mechanism) are released from the locking positions and the seat body 1 is flipped up while the seat body 1 located at the flip-up position 100A is not in the slide locked state (i.e., while the seat body 1 is allowed to slide), it may be difficult for the seat body 1 to be coupled again with the second slide mechanism 250 at the flip-up position 100A. In order to avoid this situation, the restricting mechanism restricts the operations of the flip-up locking devices 260, 270 (coupling/decoupling switching mechanism) and the slide mechanism 100, so that the seat body 1 is stored with improved reliability.

While one embodiment of the invention has been described above, the vehicle seat of the present invention is not limited to this embodiment, but the invention may be embodied in various other forms. In the illustrated embodiment, the operating lever mechanism 50 is arranged to initiate operations of the operating mechanisms 280, 190, 290 based on detection of the forward-tilted position 1B of the seat back 2. However, the vehicle seat of the invention may not include the arrangement for detecting the forward-tilted position 1B of the seat back 2. Namely, the vehicle seat of the invention may only include the arrangement for detecting the flip-up position at which the second slide mechanism is placed in the slide locked position, through coordinated operations of the flip-up locking device operating mechanism and the second slide locking device operating mechanism, without placing the seat back of the seat body in the forward-tilted position, when the operating lever mechanism is operated. In this case, when the seat body is located at the flip-up position, an arrangement for placing the seat back in the forward-tilted position will be required.

What is claimed is:
1. A vehicle seat comprising:
   a seat body comprising a seat cushion and a seat back, and having a standing position in which the seat back stands up relative to the seat cushion, and a forward-tilted posi- tion in which the seat back is tilted forward, the seat body being adapted to be flipped up toward a side wall of a vehicle compartment and stored when the seat body is in the forward-tilted position; and a slide mechanism provided on a vehicle body constituent member, and on which the seat body is mounted such that the seat body is slidable relative to the vehicle body constituent member, wherein the slide mechanism comprises a first slide mechanism and a second slide mechanism that are located on opposite sides of the seat body and arranged in a parallel manner with each other to extend in a longitudinal direction of the vehicle, the second slide mechanism being disposed inwardly of the first slide mechanism in the vehicle compartment, as viewed in a width direction of the vehicle, the first slide mechanism is provided with a rotation hinge mechanism including a biasing member that causes the seat body to flip up toward the side wall of the vehicle compartment, the second slide mechanism is provided with a coupling/decoupling switching mechanism that is selectively placed in a locking position in which the second slide mechanism and the seat body are coupled with each other, and an unlocking position in which the second slide mechanism and the seat body are allowed to be decoupled from each other, the seat body being adapted to be flipped up by the biasing member when the coupling/decoupling switching mechanism is in the unlocking position, and the slide mechanism includes a flip-up position detecting unit that detects a predetermined flip-up position of the seat body within a slidable range over which the seat body is slidable on the slide mechanism, the coupling/decoupling switching mechanism being switched to the unlocking position when the flip-up position detecting unit detects the predetermined flip-up position.

2. The vehicle seat according to claim 1, wherein, each of the first slide mechanism and the second slide mechanism comprises a lower rail disposed on the vehicle body constituent member, and an upper rail on which the seat body is mounted, the lower rail and the upper rail being slidably engaged with each other, each of the first slide mechanism and the second slide mechanism including a slide locking mechanism placed between the lower rail and the upper rail and operable to lock the lower rail and the upper rail at a desired position in a sliding direction thereof for positioning of the upper and lower rails relative to each other, the slide mechanism includes an operating mechanism that operates the coupling/decoupling switching mechanism and the slide locking mechanism in conjunction with each other, the coupling/decoupling switching mechanism includes a hook and a striker placed between the upper rail of the second slide mechanism and a lower portion of the seat body, the hook and the striker being adapted to be engaged with each other so as to couple the second slide mechanism with the seat body, and disengaged from each other so as to decouple the second slide mechanism from the seat body, and when the flip-up position detecting unit detects the flip-up position of the seat body, the operating mechanism operates to place the slide locking mechanism in a slide locking position for locking the slide mechanism, in conjunction with an operation thereof to place the coupling/decoupling switching mechanism in the unlocking position, so that the seat body located at the flip-up position is automatically flipped up.

3. The vehicle seat according to claim 2, further comprising:

a forward-tilted position detecting unit that detects that the seat body is in the forward-tilted position, wherein the operating mechanism operates the coupling/decoupling switching mechanism and the slide locking mechanism when the forward-tilted position detecting unit detects that the seat body is in the forward-tilted position.

4. The vehicle seat according to claim 2, wherein the slide mechanism includes a restricting mechanism that inhibits the coupling/decoupling switching mechanism from being placed in the unlocking position until the slide locking mechanism is completely placed in the slide locking position when the operating mechanism operates the slide locking mechanism and the coupling/decoupling switching mechanism in conjunction with each other.

* * * * *